United States Patent
Holsinger

[11] Patent Number: 5,241,429
[45] Date of Patent: Aug. 31, 1993

[54] ADAPTIVE PREWRITE COMPENSATION APPARATUS AND METHOD

[75] Inventor: Steven V. Holsinger, Oklahoma City, Okla.

[73] Assignee: Seagate Technology, Inc., Scotts Valley, Calif.

[21] Appl. No.: 741,086

[22] Filed: Aug. 6, 1991

Related U.S. Application Data

[63] Continuation-in-part of Ser. No. 319,251, Mar. 3, 1989, Pat. No. 5,047,876.

[51] Int. Cl.$^5$ .............................................. G11B 5/09
[52] U.S. Cl. ........................................ 360/46; 360/45; 360/51; 360/67
[58] Field of Search ................... 360/44, 45, 46, 51, 360/67

[56] References Cited

U.S. PATENT DOCUMENTS

| | | | |
|---|---|---|---|
| 3,879,342 | 4/1975 | Patel | 360/45 |
| 4,000,513 | 12/1976 | Precourt | 360/45 |
| 4,205,352 | 5/1980 | Tomada | 360/45 |
| 4,245,264 | 1/1981 | Allen | 360/51 |
| 4,306,257 | 12/1981 | Harman | 360/67 |
| 4,525,753 | 6/1985 | Shimeki et al. | 360/45 |
| 4,633,336 | 12/1986 | Horie et al. | 360/45 |
| 4,635,141 | 1/1987 | Coulter | 360/44 |
| 4,809,088 | 2/1989 | Lofgren et al. | 360/31 |
| 5,025,327 | 6/1991 | Stamness et al. | 360/49 |
| 5,159,501 | 10/1992 | Genheimer | 360/45 |

*Primary Examiner*—David Mis
*Attorney, Agent, or Firm*—Edward P. Heller, III; Bill D. McCarthy; Louis W. Watson

[57] ABSTRACT

A prewrite compensation circuit for use with a hard disk drive wherein surfaces of disks of the drive are formatted for writing data to the surfaces at different frequencies selected for different concentric zones on the surface. Data to be written is passed through a shift register to a series of delay elements and a multiplexer that passes the output of a delay element selected in relation to a data word received by the multiplexer to a write circuit that writes the data to the disc. The delay words, or elements of delay words, are stored in latches that are selectively connected to the multiplexer, or a delay word accumulator connected to the multiplexer, in relation to the pattern of bits surrounding a bit to be written. A delay calibration circuit includes an inverter and a timing circuit that connects the inverter across the delay elements, or a series of delay elements having the same electrical characteristics, for a series of time intervals prior to writing to a new zone to form a ring oscillator whose oscillations clock a counter during each time interval. Following each time interval, the counter contents are entered into a selected latch.

12 Claims, 8 Drawing Sheets

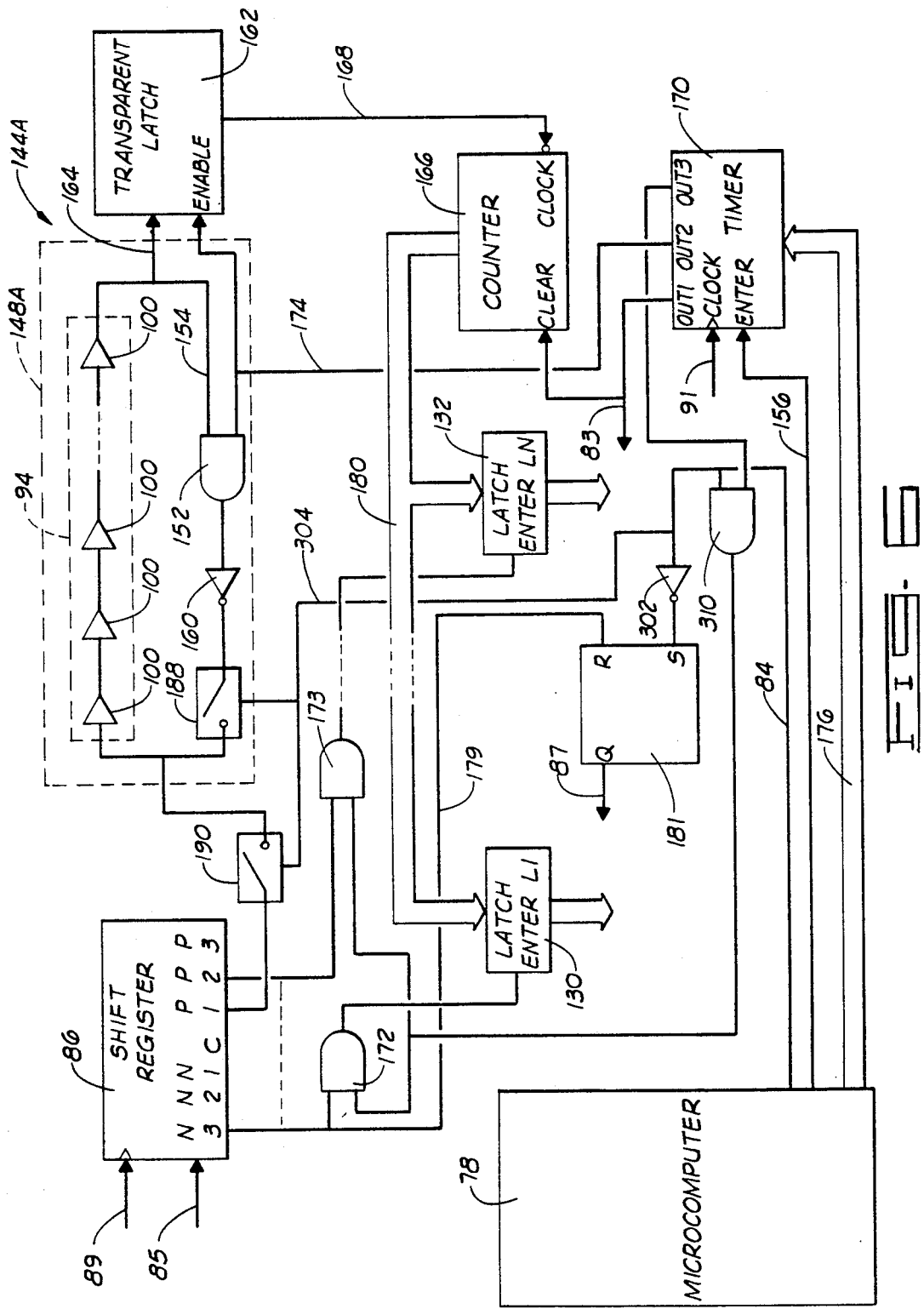

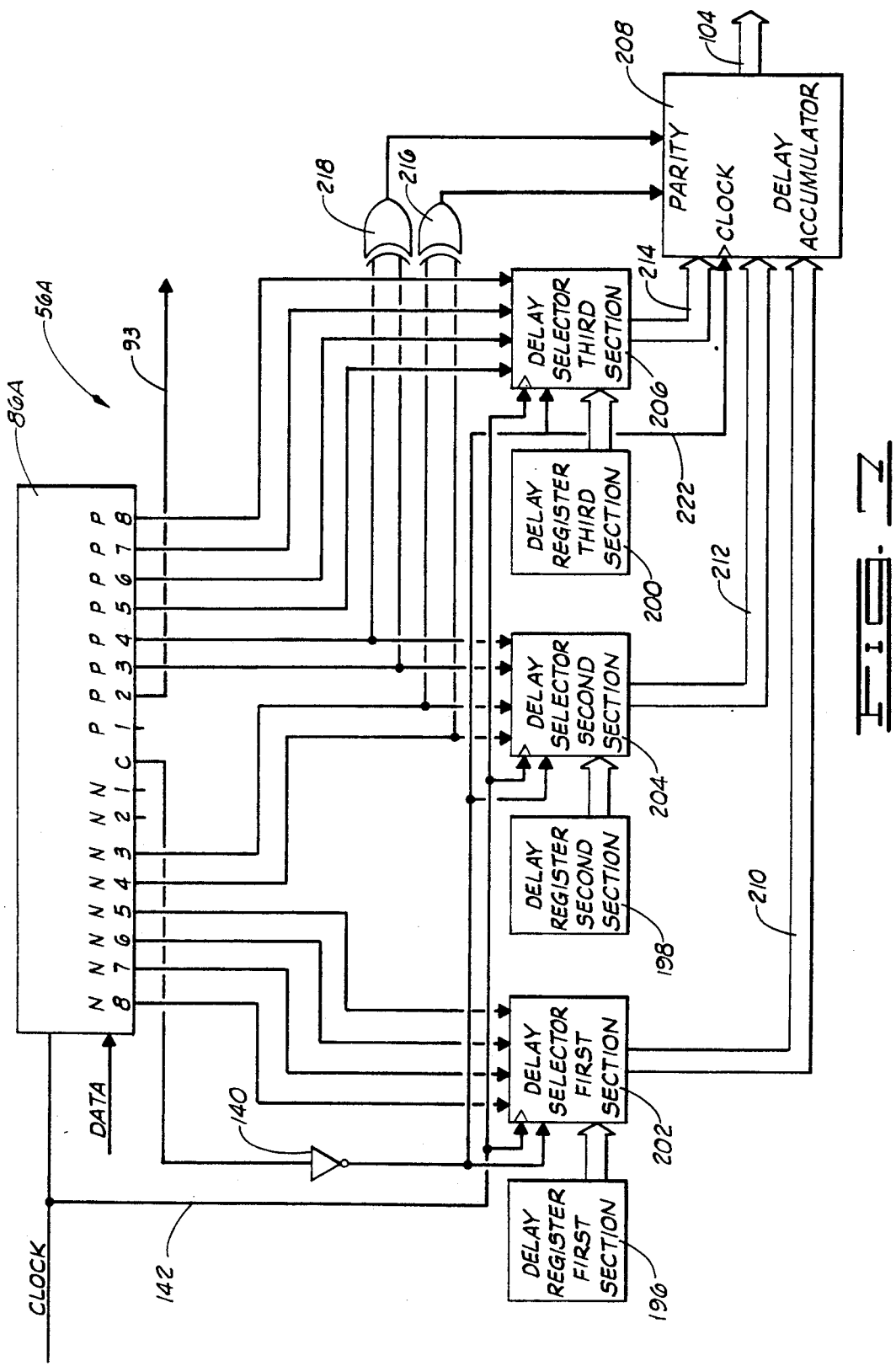

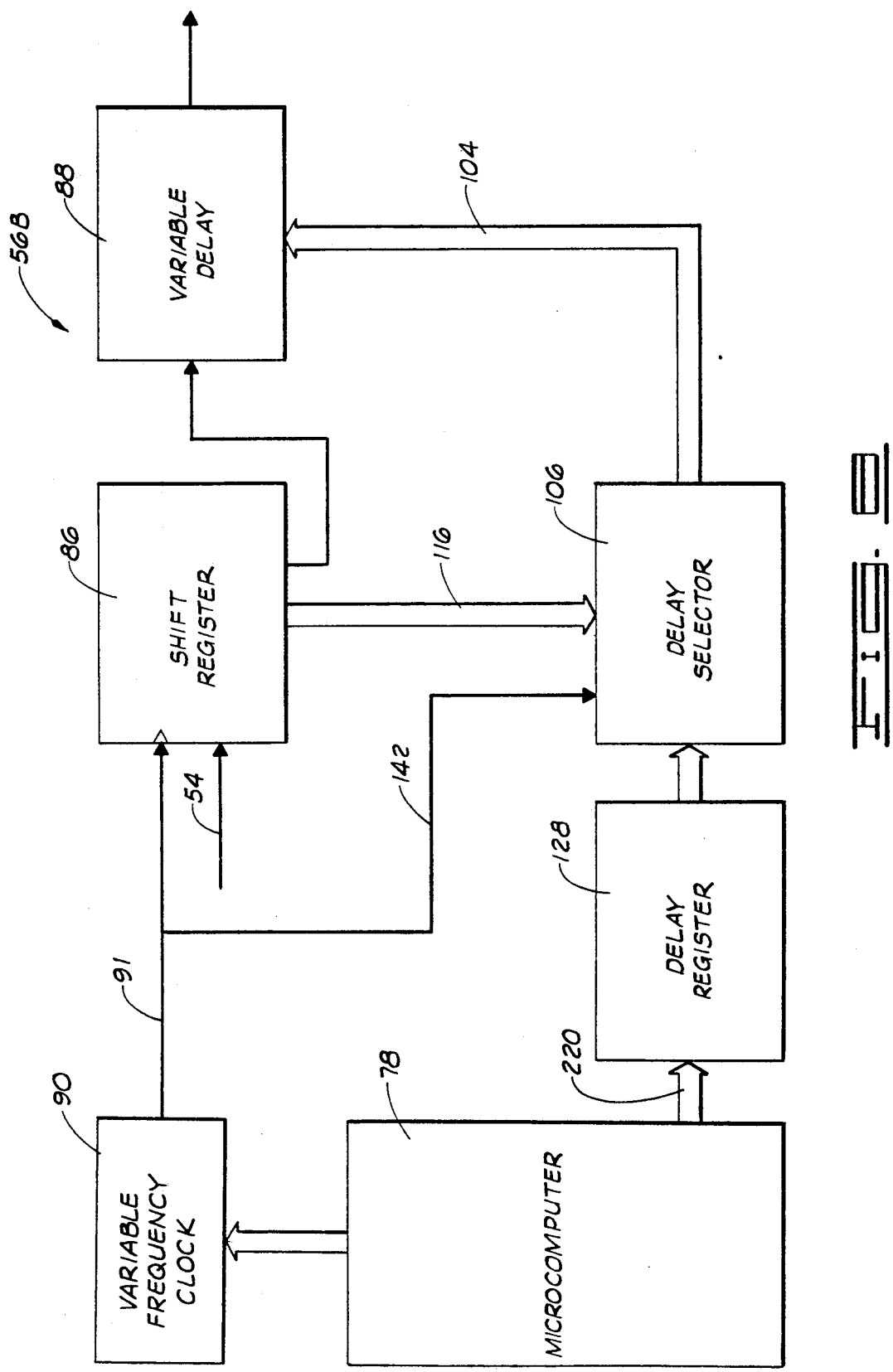

ADAPTIVE PREWRITE COMPENSATION APPARATUS AND METHOD

CROSS REFERENCE TO RELATED APPLICATION

The present application is a continuation-in-part of U.S. patent application entitled "Adaptive Prewrite Compensation Apparatus", Ser. No. 319,251, filed Mar. 3, 1989 now U.S. Pat. No. 5,047,876 by Stephen R. Genheimer and Steven V. Holsinger.

BACKGROUND OF THE INVENTION

1. Field of the Invention

The present invention relates generally to improvements in magnetic recording methods and apparatus, and, more particularly, but not by way of limitation to improvements in recording methods an apparatus for hard disc drives.

2. Brief Description of the Prior Art

In a hard disc drive, data generated by a computer is stored on concentric tracks defined in a magnetizable surface coating on a rotating disk by a read/write head that "flies" over the surface coating in close proximity to the disc surface. To this end, the drive is comprised of a write amplifier which receives the data in the form of a serial stream of data bits that are each expressed as one of two logic levels and responds by passing a current through the read/write head that magnetizes lengths of the track in on of two directions. More particularly, the direction of the current is reversed each time a bit having a non-zero logic level is received to reverse the direction of magnetization of the track. Such a magnetization reversal can be viewed as a "magnetic charge" at the location at which the magnetization reversal occurs with the sign of the "charge" being determined by the directions of the magnetization of the track to either side of the reversal. The rotation of the disc is maintained substantially constant and the data stream is clocked into the write amplifier at a constant rate so that the spacing of these "charges" along the track reflects the temporal spacing of the non-zero bits in the data stream. As will be clear to those skilled in the art, these "magnetic charges"; that is, the magnetization reversals, will produce a total magnetic field adjacent the disc that is a superposition of the fields produced by the individual magnetization reversals and which rotates with the disc.

When the data is read back, the read/write head is used as a pickup coil that responds to changes in the total magnetic field in which it is immersed to generate an electromotive force. For widely spaced magnetization reversals, only the magnetization reversal nearest the read/write head contributes significantly to the magnetic field at the read/write head with the result that the emf has the form of a series of emf pulses, each associated with only one of the magnetization reversals and each having a peak value that occurs when the read/write head is aligned with the portion of the track at which the magnetization reversal occurs. Accordingly, the emf pulse peaks have a temporal spacing that reflects the spacing of the magnetization reversals along the track and the emf pulses can be peak detected to provide a stream of digital pulses having an edge that corresponds to the peaks of the emf pulses. Since the spacing of the magnetic reversals reflects the temporal spacing of the non-zero bits of the original data stream and the temporal spacing of the emf peaks reflects the spacing of the magnetic reversals along the track, the data that is read from the disc is recovered in the form of a data stream that, ideally, is identical to the data stream that was written to the disc.

In practice, several effects interfere with this identity of the written and read data streams. Thus, for example, the rotation rate of the disc varies with time so that the temporal spacing of the emf peaks is not the same as the temporal spacing of the non-zero bits of the data stream that is written to the disc. This effect is commonly overcome by passing the pulses generated in the read circuit through a phase locked oscillator whose output defines a series of "read windows" that are locked to the stream of bits returned from the disc.

A second effect, an effect which not only causes a departure of the written and read data streams from an identity but can also interfere with the phase locking of the read circuit on the returned data stream, is so-called "peak shift" that arises when the magnetic reversals are closely spaced along a data track. When the magnetic reversals are closely spaced, the magnetic fields produced at the read/write head by magnetic reversals other than the magnetic reversal nearest the head will contribute to the total magnetic field in which the read/write head is immersed sufficiently to cause a temporal shift in the emf peak associated with the nearest magnetization reversal. Thus, while the emf induced in the head will still have the form of a series of pulses generally associated with individual magnetization reversals, the temporal spacing of the peaks of the pulses will no longer reflect the spacing of the magnetization reversals along the track. Peak shift causes shifting of the read windows so that the digital pulses generated in the read circuit in response to the emf peaks can occur in the wrong read windows with the result that the data that is recovered from the disc is not the same as the data that was written to the disc.

A commonly adopted solution to peak shift is prewrite compensation of the data that is written to the disc. In prewrite compensation, each non-zero bit of the data stream that is written to the disc is temporally shifted, in relation to previous and ensuing bits, as the data stream is written so that the pattern of magnetization reversals along a data track is distorted by an amount that is just sufficient to cause the temporal spacing of the emf peaks induced in the read/write head, upon reading of the data, to be very nearly identical to the temporal spacing of non-zero bits in the original data stream.

In disc drives that have limited storage capacity so that the magnetization reversals have a relatively large spacing, prewrite compensation can be effected with simple circuitry that can be easily included on the surfaces of silicon chips on which other circuits of the disc drive are formed using large scale integration techniques. Thus, for example, in U.S. Pat. No. 4,633,336, issued Dec. 30, 1986 to Horie, et al., prewrite compensation is carried out by passing the data stream to be written to the disc through a series of three flip flops and transmitting each non-zero bit that appears in the central flip flop to the write circuit with, or without, a delay depending upon the logic levels in the remaining two flip flops. Thus, the prewrite compensation circuit taught by Horie et al. provides compensation only with respect to the logic levels of the two bits that are nearest in the data stream to a bit that is written.

In disc drives that have a larger storage capacity, attained in part by writing the data stream to be stored at a high frequency that will result in close spacing of the magnetization reversals along a data track, prewrite compensation becomes more difficult. Because of the close spacing of the magnetization reversals, several non-zero bits preceding and following the bit that is currently being written can have an effect on the temporal spacing of the peaks of the emf pulses induced in the read/write head when data is recovered from the disc. Thus, the prewrite compensation requires more complex circuitry. One technique that has been used is to store appropriate amounts of delay in a ROM and address the ROM with the pattern of data bits about the bit to be written as taught in U.S. Pat. No. 4,000,513, issued Dec. 28, 1976 to Precourt.

The problem of circuit complexity in effecting prewrite compensation has been exacerbated by recent developments in the disc drive art designed to maximize the data storage capacity of disc drives. As disclosed in U.S. Pat. No. 4,799,112, issued Jan. 17, 1989 to Bremmer et al., the teachings of which are hereby incorporated by reference, the storage capacity of a disc drive can be maximized by dividing the surfaces of the discs into zones and writing data to each track in a zone at a zone frequency that is selected to optimize resolution of the data stream that is read from the discs. Because of the writing of data at a plurality of frequencies, each of which can require different amounts of prewrite compensation, circuitry for effecting prewrite compensation, if it is to be effective, can become very complex indeed.

This complexity introduces new problems. Since compensation is effected as a stream of data bits is written to the disc, the appropriate amount of delay of the non-zero bits must be determined and applied very rapidly so that time is generally not available, without limitations on the write frequency, to recover the appropriate amount of delay from a memory device that is formed on a chip that is separate from remaining portions of the prewrite compensation circuit. While a suitable memory device can be formed on the chip that contains remaining portions of the prewrite compensation circuit using large scale integration techniques a price is exacted for doing so. The more complex a large scale integrated circuit becomes, the more silicon surface area the circuit occupies and the more expensive the integrated circuit becomes. Thus, until the present invention, the manufacturer of disc drives has been faced with a Hobson's choice. He can limit the frequencies at which data is written to discs, and thereby limit the data storage capacity of his drives, or he can increase his manufacturing costs to provide his drives with suitable prewrite compensation circuitry.

SUMMARY OF THE INVENTION

The present invention solves this problem by providing a prewrite compensation circuit including circuitry that can be inexpensively implemented on a single chip to provide prewrite compensation of a data stream that is written to a disc at a high frequency and, moreover, at frequencies that are varied from zone to zone on a disc. To this end, and in one aspect of the invention, the invention exploits the time required to move the head from one zone to another to access a track to which data is to be written. Since this movement requires the physical displacement of the read/write head across the disc, it is generally much larger than the time required to transfer information between silicon chips. Thus, in one aspect of the invention, it is contemplated that prewrite compensation values for only a zone to which data is currently being written will be stored for use during writing and these values will be stored in a plurality of latches whose contents are updated each time a transition is made from writing in one zone to writing in another zone. To this end, prewrite compensation values for all zones can be stored in a microcomputer for entry into the latches each time a zone change is made. During writing, the data stream is passed through a shift register and logic circuitry is provided to select, on the basis of previous and ensuing bit logic values about a bit being written, the latch which contains a delay word that is appropriate to the pattern of bits. The delay word is transmitted to a variable delay that responds by delaying the written bit by an amount that has been predetermined for the pattern of bits in which it is embedded.

In a second aspect of the invention, provision is made for drift in the variable delay. In this regard, the variable delay is comprised of a delay circuit that is, in turn, comprised of a series of delay elements. Each delay element has the form of a date circuit and the delay circuit is tapped between delay elements so that the delay can be effected by passing a bit to be written down the series of delay elements to a tap that is selected on the basis of the delay word. Thus, the amount of time that a bit is delayed in writing is the time required for a selected number of gates to change state. As is known in the art, the time required for a gate circuit to change state depends upon a number of factors; for example, variations in manufacturing processes when the gate was formed and circuit operating conditions such as the temperature of the circuit and the voltage of the power supply that is used to provide power for the circuit.

In the second aspect of the invention, the prewrite compensation circuit further comprises a novel calibration circuit that adjusts the delay words in the latches, on a drive-by-drive basis, in accordance with current operating conditions. To this end, the calibration circuit contains a second delay circuit, comprised of delay elements that are substantially identical to the delay elements of the delay circuit of the variable delay, an inverter that can be connected across a selected portion of the second delay circuit to form a ring oscillator, and a timing circuit that fixes the time the oscillator is so formed. A counter is connected to the oscillator to count oscillations for a time interval selected for each delay word and, at the end of the time interval, the contents of the counter are stored in the latch for which the time interval has been selected. Thus, by operating the delay circuit as an oscillator for a series of time intervals, each latch can be loaded with a delay word that is not only appropriate to a particular pattern of bits about a bit to be written but appropriate for the disc drive and for current conditions under which the disc drive is operating. In a modification of the calibration circuit, the ring oscillator is formed using the delay circuit of the variable delay.

In a third aspect of the invention, the prewrite compensation circuit selects an amount of delay based on an extended number of bits to either side of a bit that is written to a disc without substantially increasing the cost of forming the circuit on a silicon chip using large scale integration techniques. To this end, the latches are formed into delay register sections that are each associated with groups of the surrounding bits and a plurality of delay word elements are stored in the latches of each delay register section. During the writing of data, a selection circuit, similarly comprised of sections associated with the groups of surrounding bits, selects a latch from each delay register section in relation to the pattern of bits in the group selected for that delay register section. The contents of the selected latches are transmitted to a delay word accumulation circuit which adds, or subtracts, the delay word elements to form the delay word that is transmitted to the variable delay.

An object of the present invention is to provide a prewrite compensation circuit for a disc drive that can be inexpensively included in a disc drive having a maximized data storage capacity.

Another object of the invention is to provide a prewrite compensation circuit for a disc drive that facilitates writing of data to a disc of the drive with an optimum write frequency.

Still another object of the invention is to provide a prewrite compensation circuit for a disc drive that further compensates for changes in operating conditions during use of the drive.

Other objects, features and advantages of the present invention will become apparent from the following detailed description when read in conjunction with the drawings and appended claims.

BRIEF DESCRIPTION OF THE DRAWINGS

FIG. 6 is a schematic circuit diagram of a second preferred form of the delay calibrator for the prewrite compensation circuit.

FIG. 7 is a schematic circuit diagram of a second preferred form of the delay selector for the prewrite compensation circuit.

FIG. 8 is a schematic circuit diagram of a second preferred embodiment of the prewrite compensation circuit of the present invention.

FIG. 9 is a timing diagram for the timer of FIGS. 5 and 6.

DETAILED DESCRIPTION

Figure 1:
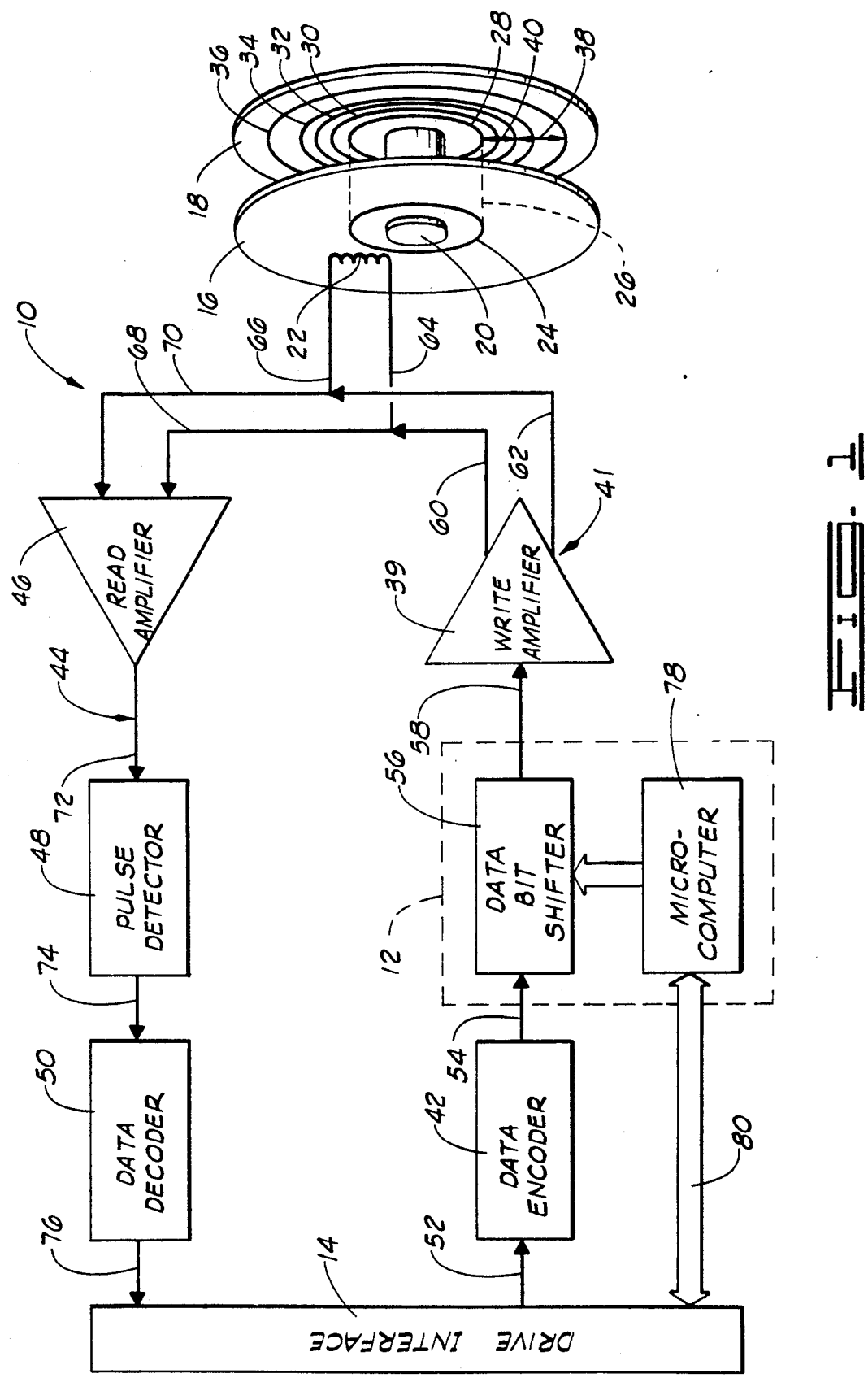
FIG. 1 is a schematic diagram of the read/write circuit of a disc drive containing a prewrite compensation circuit constructed in accordance with the present invention.

Description of FIG. 1

Referring first to FIG. 1, shown therein and designated by the general reference numeral 10 is a schematic diagram of a hard disc drive read/write circuit containing a prewrite compensation circuit 12 constructed in accordance with the present invention. In general, the read/write circuit 10 is comprised of a drive interface 14, by means of which the circuit 10 communicates with a host computer (not shown) for storage of data generated by the host computer, and FIG. 1 contemplates that the drive interface 14 contains conventional circuitry for temporarily storing such data and converting the data to a serial data stream for storage to a rotating disc as will be described below. For purposes of discussion, two data storage discs, 16 and 18, have been shown in FIG. 1; however, it will be recognized by those skilled in the art that the present invention could equally well be practiced in a disc drive having substantially any number of data storage discs. As is conventional, the discs 16 and 18 are mounted on a common spindle 20 for rotation about the axis of the spindle during operation of the disc drive.

The discs 16 and 18 have magnetizable surface coatings and a read/write head 22, only one of which has been indicated in FIG. 1 and drawn as a coil therein, is provided for each disc surface to which data is to be written. During operation of the disc drive, the read/write heads are caused to "fly" over the disc surfaces, in very close proximity to the surfaces, by air swirled by the rotation of the discs 16 and 18. The loci of points on the discs adjacent the read/write heads define circular data tracks, such as the data track 24 on the disc 16, and the heads are aligned to form the data tracks on different disc surfaces into concentric cylinders. One cylinder has been indicated in dashed lines in FIG. 1 and indicated by numeral 26 therein. Thus, in FIG. 1, the surface of the disc 18 that has been shown will include a track 28 that is included in the cylinder 26 which contains the track 24.

The disc 18 further illustrates a feature of a disc drive that is within the contemplation of the present invention. Specifically, it is contemplated that the data tracks on the disc surfaces will be grouped into write frequency zones, as taught in the aforementioned U.S. Pat. No. 4,799,112 to Bremmer et al., and such has been indicated for the track 28 and tracks 30, 32, 34 and 36 by arrows 38 and 40 that generally indicate two zones on the visible surface of disc 18. It will, of course, be recognized by those skilled in the art that the disc surfaces contain many more tracks than the number that has been shown and, additionally, that these tracks will be grouped into many more zones than the two which have been shown. As taught by Bremmer et al., data is written in each zone at a frequency that is selected for that zone to provide an optimum resolution for data read from tracks of the zone. More recently, the zoning of surfaces of discs of a disc drive has been described in U.S patent application Ser. No. 359,740 entitled "Method for Assigning Tracks on a Magnetic Data Storage Disk to Different Read/Write Frequency Zones", filed May 31, 1989 by Dahandeh et al. The present invention contemplates zoning may be effected by either of the methods taught in these references.

In order to effect the writing of data to a disc, the read/write circuit is further comprised of a write amplifier 39 forming part of a write channel generally indicated at 41 in FIG. 1. The write channel is further comprised of a data encoder 42 and, in the practice of the present invention, the prewrite compensation circuit 12. Reading is carried out by a read channel, generally indicated at 44, comprised of a read amplifier 46, a pulse detector 48 and a data decoder 50. (As is conventional, the read and write channels further comprise head selection circuitry that enables a specific read/write head to be selected for writing data to the disc surface associated therewith or for reading data from such surface. For clarity of illustration, such circuitry has not been shown in the drawings.)

In order to provide a full appreciation of the present invention, it will be useful to consider briefly the manner in which data is written to and read from the discs 16 and 18 before turning to the prewrite compensation circuit 12 that is the subject of the present invention. As noted above, data is brought into the disc drive via the interface 14 wherein, for writing, the data is converted into a serial data stream in NRZ format that is transmitted to the data encoder 42, via a conducting path 52, for encoding in a format that is more suitable for storage to a disc. Thus, for example, the encoder 42 may convert the format to the conventional 1,7 code or 2,7 code, both of which will be discussed below with respect to specific embodiments of the invention. From the data encoder 42, the encoded data stream is transmitted, via conducting path 54, to a data bit shifter 56 of which the prewrite compensation circuit 12 is comprised and thence, via conducting path 58, to the input of the write amplifier 39. As the data leaves the data encoder 42, it has the form of a stream of successive data bits, that are expressed at one of two voltage levels defining zero and non-zero logic levels, and one result of the encoding is to separate all bits having a non-zero logic level by at least one bit having a logic level zero. This general form is preserved by the prewrite compensation circuit 12 so that the write amplifier 39 receives a series of spaced data bits having the non-zero logic level while writing takes place. Functionally, the write amplifier 39 is a power toggle flip flop whose outputs are connected across the ends of the read/write head 22, via conducting paths 60, 62, 64 and 66. The bits of the encoded data stream are received at the write amplifier toggle input so that the write amplifier passes a current through the read/write head with the direction of the current being reversed with each new non-zero bit received thereby. These currents cause the read/write head 22 to generate a magnetic field which magnetizes the data track presently aligned with the head 22 in one of two opposite directions as discussed above.

During reading, the changing magnetic fields arising from the passage of magnetization reversals formed during the writing of data induce emf pulses in the read/write head 22 and the ends of the read/write head 22 are connected, via conducting paths 68 and 70, across the inputs of the read amplifier 46 to increase the amplitudes of these pulses. From the read amplifier 46, the emf pulses are transmitted to the pulse detector 48, via conducting path 72, where the emf pulses are converted to a stream of digital pulses via differentiation and zero crossing detection to recover the encoded digital data stream. This stream is transmitted to the data decoder 50, via a conducting path 74, where it is decoded to effect a return to the NRZ format. The decoded stream is then returned to the drive interface via a conducting path 76.

Control of the above described operation of the disc drive is effected by a microcomputer 78 which also forms a part of the prewrite compensation circuit 12 as has been indicated in FIG. 1. Thus, the microcomputer 78 communicates with the drive interface, via a bus 80, to carry out a variety of functions, for example, the selection of the track and disc surface to which data is to be written and selection of the frequency at which the data is to be written. The function of the microprocessor 78 as a portion of the prewrite compensation circuit 12 will be discussed below.

As will be clear to those skilled in the art, all of the components shown in FIG. 1, with the exception of the prewrite compensation circuit 12 of the present invention, are conventional and the operation of the read/write circuit 10, again with the exception of the operation of the prewrite compensation circuit 12 to be described below, is conventional. Thus, neither the general structure of the read/write circuit 10 nor its operation need be further considered herein for purposes of the present disclosure. Rather, it will suffice to limit further discussion to the prewrite compensation circuit 12, with occasional reference to other portions of the disc drive, to provide a teaching of the invention.

Figure 2:
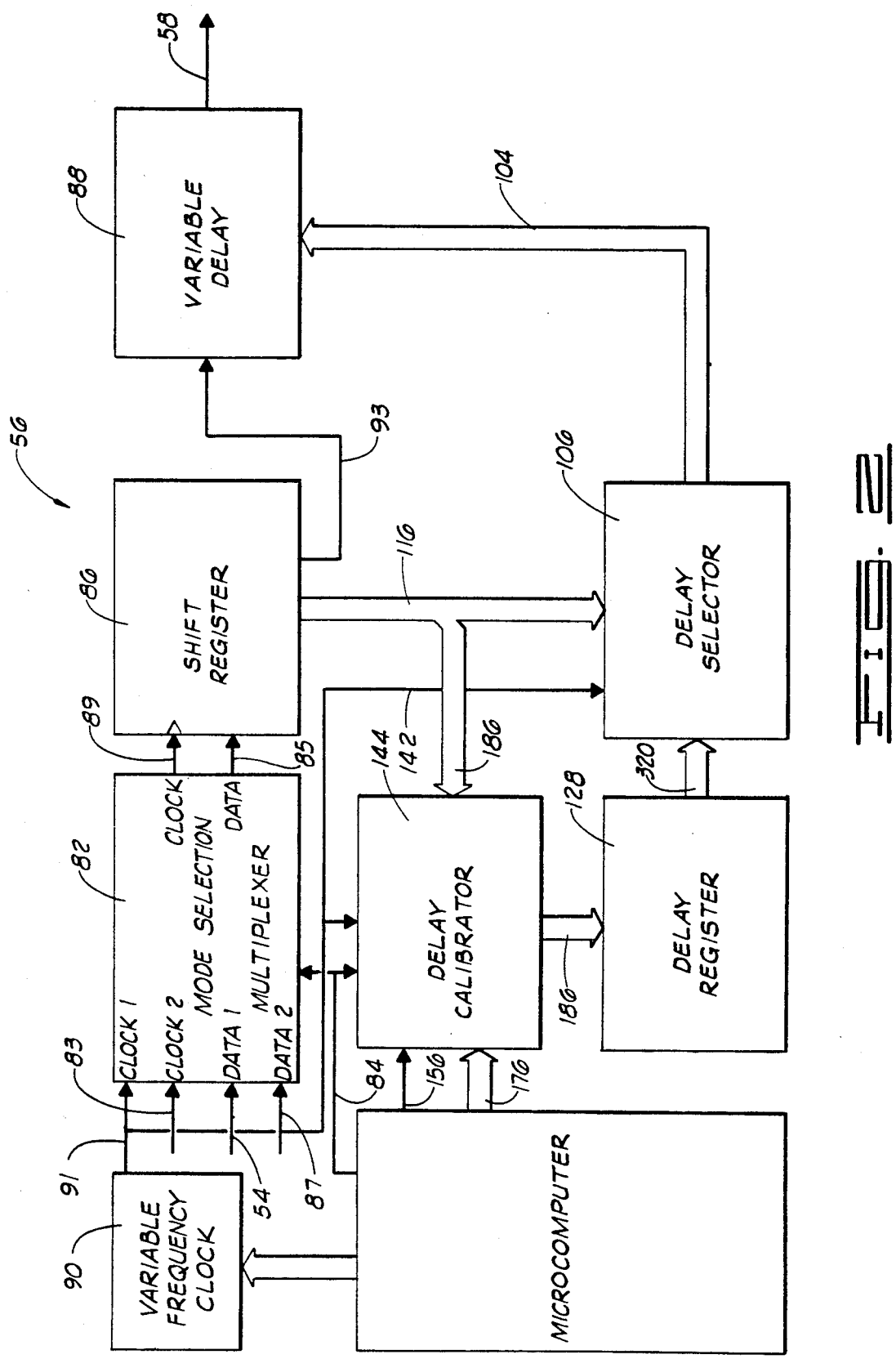
FIG. 2 is a schematic circuit diagram of one preferred embodiment of the prewrite compensation circuit of the present invention.

Description of FIG. 2

With the above background, one preferred embodiment of a prewrite compensation circuit constructed in accordance with the present invention may now be considered with reference to FIG. 2. As shown therein, the data bit shifter 56, is comprised of a shift register 86 which receives the data stream issuing from the data encoder 42 via a mode selection multiplexer 82 and, subsequently, passes each non-zero bit of the stream to a variable delay 88. After a delay time that is selected in relation to the pattern of bits surrounding the non-zero bit, the non-zero bit is transmitted to the write amplifier 39 so that, during writing of the data stream, each non-zero bit is passed through the shift register 86, delayed a selected amount in a manner described below, and then used to effect a reversal in the magnetization of a selected data track as has been described above.

More particularly, the mode selection multiplexer 82 receives the data stream on the conducting path 54 from the encoder 42 and, in response to an operating mode signal received from the microcomputer 78 on a conducting path 84, passes each bit of the stream to a data input terminal of the shift register 86 on a conducting path 85. Alternatively, the mode selection multiplexer 82 can pass logic levels received at a second data input terminal on a conducting path 87, for a purpose to be discussed below, in response to a calibration mode signal received from the microcomputer 78 on the conducting path 84.

The passage of the data through the shift register 86 time a bit of the data stream is presented to the data time a bit of the data stream is presented to the data input terminal of the shift register 86 and the present invention contemplates that such clocking will be effected at a frequency that has been selected for each zone of the discs 16 and 18 in the manner described in the aforementioned U.S. Pat. No. 4,799,112 to Bremmer et al. Thus, it is contemplated that clocking of the shift register 86 will be effected using a variable frequency clock 90, constructed in the manner described by Bremmer et al., during the operating mode of the apparatus 12. To this end, clock signals provided by the variable frequency clock 90 are transmitted to the mode selection multiplexer 82 on a conducting path 91 for transmission therefrom during the operating mode to a clock input terminal of the shift register 86 on a conducting path 89. During the calibration mode to be discussed below, clock signals received via a conducting path 83 at a second clock input terminal of the mode selection multiplexer 82 are transmitted to the shift register clock terminal from a source and for a purpose to be discussed below.

Figure 3:
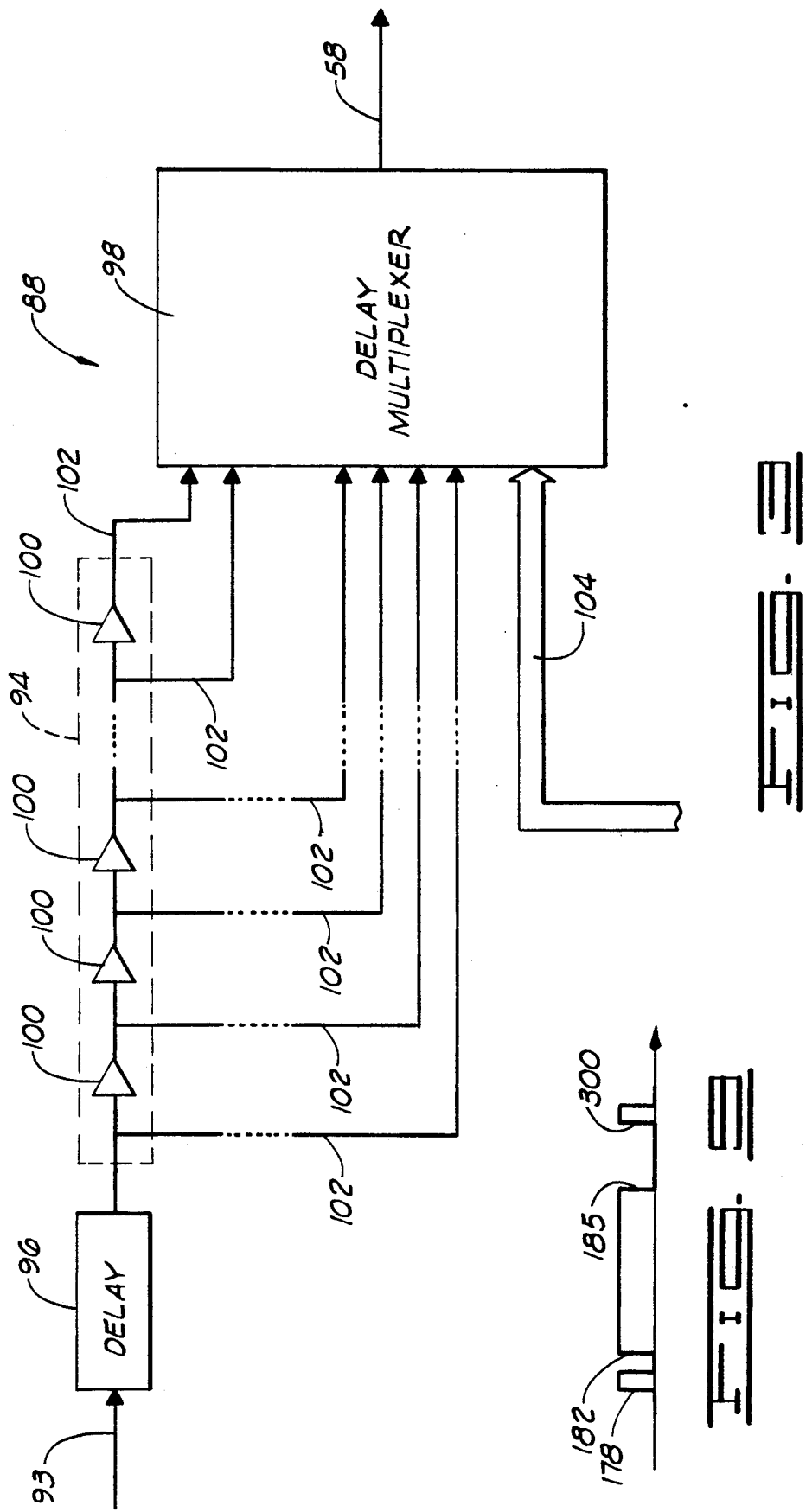
FIG. 3 is a schematic circuit diagram of the variable delay for the prewrite compensation circuit.

With additional reference to FIG. 3, the variable delay 88 is comprised of a delay circuit 94 that receives non-zero bits issuing from the shift register 86 on a conducting path 93 via a delay 96, whose purpose will be discussed below, and transmits the bit, with a plurality of delays to a delay multiplexer 98 which, in turn, transmits the non-zero bits to the write amplifier 39 via the conducting path 58. To this end, the delay circuit 94 is comprised of a plurality of delay elements 100 which, in a prewrite compensation circuit formed on a single silicon chip as part of an integrated read/write circuit, are formed during manufacture of the chip of conventional gate circuits that are the functional equivalent of buffers as illustrated in FIG. 3. Thus, a bit introduced at the input of the delay circuit 94 will travel down the series of delay elements 100, via changes in the output states of the gates of the delay elements 100, and will successively appear at the outputs of the delay elements 100 with a short delay between the appearance of the bit at the output of one delay element and the appearance of the bit at the output of the next delay element. The delay circuit 94 is tapped at the output of each delay element 10 and the outputs of the delay elements 100 are provided to the delay multiplexer 98 on conducting paths 102 so that a bit introduced to the variable delay 88 can be transmitted to the write amplifier 39 with an amount of delay that is determined by the delay element whose output is transmitted by the delay multiplexer 98. Such selection is made by a pattern of electrically expressed logic levels, constituting a delay word, that is received by the delay multiplexer 98 on a bus 104 as will be described below.

Figure 4:
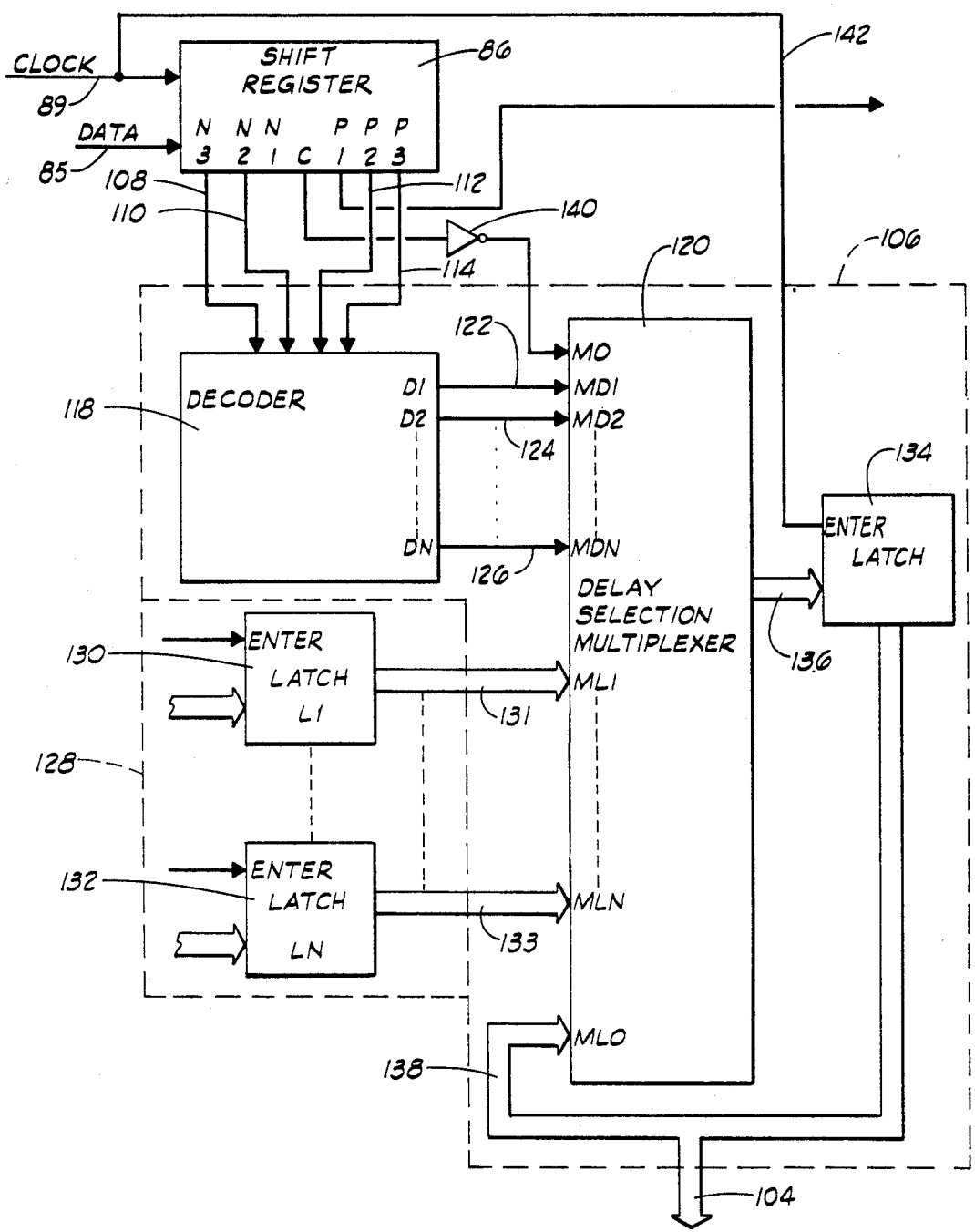
FIG. 4 is a schematic circuit diagram of one preferred form of the delay selector for the prewrite compensation circuit.

Returning to FIG. 2 and with additional reference to FIG. 4, the data bit shifter 56 is further comprised of a delay selector 106, which provides the delay word to the variable delay 88 on the bus 104. Such delay word is selected on the basis of the pattern of bits surrounding a non-zero bit to be written to a disc and such bits are transmitted to the delay selector 106 via a plurality of conducting paths 108, 110, 112, and 114 (FIG. 4) that are indicated collectively as a bus 116 in FIG. 2.

For purposes of illustration, FIG. 4 has been drawn for the case in which data is to be written to a disc in the 1,7 code and, further, for a case in which the delay word is selected on the basis of two bits of the data stream to either side of a non-zero bit to be written to a disc. It will, of course, be recognized by those skilled in the art, that the prewrite compensation circuit of the present invention is not limited to the case in which the 1,7 code is used for writing data nor is it necessary to limit delay word selection to selection on the basis of two bits to either side of a bit to be written. Rather, such case has been illustrated and will be described to provide a concrete example of the construction and operation of the prewrite compensation circuit of the present invention.

To discuss the construction and operation of the delay selector 106 in relation to the pattern of bits in the shift register 86, bit storage locations of the shift register 86 have been labeled in FIG. 4 in a manner that it is believed will provide a clearer understanding of the manner in which a delay word is selected. To this end, the shift register has a central storage location, labelled C in FIG. 4 which, in the operation of the prewrite compensation circuit 12, receives each bit of the data stream sequentially and, more particularly, will at some time contain a non-zero bit to be written to a disc. To the left of this storage locations are locations labelled N1, N2 and N3 which, when a bit to be written to a disc is contained in location C, will contain the "next" three bits of the data stream; that is, bits that successively follow the bit in location C in time. Similarly, the previous three bits of the data stream will be contained in shift register locations indicated at P1, P2 and P3.

As noted above, FIG. 4 has been drawn for the case in which data is to be written to a disc in 1, 7 code and it will be useful to briefly describe this code before continuing with the structure of the delay selector 106 and its relationship to the shift register 86. As has been described above, the writing of data to a data track on a disc is physically effected by reversing the direction of magnetization of the surface coating on the disc along the track for each non-zero bit of the encoded data stream. Thus, the information carried by the data stream will be contained in the spacing of magnetization reversals and, consequently, in the temporal spacing of non-zero data bits in the encoded data stream. In a 1,7 code, at least two, but no more than eight, periods of the clock 90 must elapse following a non-zero bit before the next occurs in the data stream. Thus, each non-zero bit; that is, a change in the logic level in the data stream that will toggle the write amplifier 39, is both followed, and preceded, by at least one zero bit, but no more that seven zero bits, in which no change in the logic level of the data stream occurs. Similarly, in a 2,7 code, non-zero bits of the data stream are separated by at least two zero bits but no more than seven.

In the operation of the prewrite compensation circuit 12 shown in FIGS. 2 and including the delay selector 106 shown in FIG. 4, a delay word is selected and transmitted to the variable delay 88 each time a non-zero bit is clocked into the shift register storage location C on the basis of bits of the data stream then located in locations N3, N2, P2 and P3. (In accordance with the rules of the 1,7 code, the locations N1 and P1 will contain bits having a logic level zero at this time so that these locations need not be used in the selection of the delay word.) The bits in these locations are transmitted to the inputs of a conventional decoder 118 via the conducting paths 108, 110, 112 and 114 so that, at the time that a non-zero bit to be written to a disc is contained in the location C, the decoder 118 is addressed by nine possible patterns of bits that can be contained in the locations N3, N2, P2 and P3. Consistently with the rules of the 1,7 code, such patterns will consist of all combinations of the bits 00, 01 and 10 in the locations N3 and N2 respectively with the same combinations in the locations P2 and P3 respectively.

The decoder 118 has a plurality of outputs which can be generally referred to by numbers D1 through DN, as indicated in FIG. 4, and the number N of such outputs, up to two to the power of the number of inputs, can be selected by the precise structure of the decoder using conventional logic circuit design In the example under discussion, N is chosen to be six in accordance with the following scheme.

Initially, it will be recalled that the emf induced in the read/write head 22 arises from relative motion of the head 22 and a disc that will cause changes in the magnetic field produced by the magnetization reversals along a data track of a disc. This magnetic field can be viewed as the superposition of component fields arising from individual magnetization reversals so that the emf can, in turn, be viewed as a superposition of individual emf pulses associated with the individual magnetization reversals. Peak shift occurs when the spacing of the magnetization reversals is such that a number of these individual emf pulses overlap and the amount of peak shift for a given emf pulse that is used to regenerate a digital pulse in the read channel; that is, a bit being read, will depend on both the spacing and shape of these individual emf pulses. In many cases, these individual pulses will be bilaterally symmetric in time about a peak value and, in such case, the peak shift caused by pulses preceding and succeeding an emf pulse being read will have counteracting effects. More particularly, if the preceding and succeeding emf pulses are symmetrically disposed in time about an emf pulse being read, the effects of the preceding and succeeding emf pulses will substantially cancel to result in no peak shift. Thus, the peak shift to a subsequently read emf pulse corresponding to a non-zero bit in the shift register location C caused by a pattern of bits 10 in the locations N3, N2 will cancel with the pattern 01 in the locations P2, P3. Similarly, the patterns 00 and 01 in the locations N3, N2 will cancel the effect of the patterns 00 and 10 respectively in the locations P2, P3. In the selector circuit 106, each of these three patterns are deemed to be a "nominal" pattern and one decoder output is assigned to this nominal pattern.

It will be further recognized that, of the various patterns of bits that might surround a non-zero bit in a data stream, there will exist one pattern that will result in the greatest amount of delay in the reading of the non-zero bit after storage to a disc. This pattern is selected as a reference pattern requiring no delay of writing the bit in location C to the disc and no decoder output is assigned for this pattern. One decoder output is assigned to each of the remaining five patterns so that, with three patterns corresponding to the nominal pattern, N is chosen to be six for the decoder 118. Thus, the decoder 118 has six outputs These are connected to a delay selection multiplexer 120.

Like the decoder 118, the delay selection multiplexer 120 is a conventional gate circuit of the type that will transmit one of a plurality of digitally encoded words received thereby in response to reception of a signal received at one of a plurality of word selection inputs indicated by the labels M0 and MD1 through MDN. In the case at hand, N for the multiplexer 120 is chosen to be six corresponding to the six outputs of the decoder 118 and each of the inputs MD1 through MD6 is connected to one output of the decoder 118, as indicated by conducting paths 122, 124, 126, so that the decoder 118 and delay multiplexer 120 can select any one of six digitally expressed words that are received by the delay multiplexer 120 at inputs that have been indicated by the labels MLI and MLN in FIG. 4. (N will again be six for the example under consideration). These words, the delay words used to select a particular amount of prewrite delay for writing the bit located in the shift register location C, are stored in a delay register 128 and updated, as will be discussed below, each time the read/write heads are moved from one zone to another on the discs 16, 18.

As shown in FIG. 4, the delay register 128 is comprised of a plurality of delay word latches, two of which have been illustrated and designated by the numerals 130 and 132. As indicated by labels L1 and LN on the latches 130 and 132 one latch is provided for each of the decoder outputs D1 through DN so that, in the example under consideration, N will again be chosen to be six and the delay register 128 will contain six latches. The outputs of the delay word latches are connected to data inputs ML1 through ML6 of the delay selection multiplexer 120 via buses, such as the buses 131, 133 in FIG. 4. (The buses from the delay word latches to the delay section multiplexer 120 have been collectively indicated at 320 in FIG. 2.)

It will thus be seen that the decoder 118 and the delay register 128, operating with the delay selection multiplexer 120, provide for the selection of six possible amounts of delay to be applied during writing of a non-zero bit located in the shift register location C. Further, since the delay selection multiplexer 120 is a conventional gate circuit and since no decoder output is provided for the pattern which will give rise to the maximum delay, upon reading, of a bit at the location C, such pattern will yield a zero output of the delay selection multiplexer 120. The result is that seven amounts of delay can be selected by the delay selection multiplexer 120; specifically, no delay and six levels of delay corresponding to the contents of the delay word latches of the delay register 128.

The delay selector 106 is further comprised of a latch 134 having inputs connected to the outputs of the delay selection multiplexer 120 via a bus 136 and outputs that connect to the variable delay 88 via the bus 104. An extension of this bus 104, indicated at 138, connects to a data input of the delay selection register 120, indicated by the label ML0, that corresponds to the selection input labeled M0. This selection input is connected to the shift register location C via an inverter 140 so that, each time a bit having a logic level zero appears in the location C, the delay selection multiplexer will transmit the contents of the latch 134. The latch 134 has an enter input that is connected to the clock 90, via the conducting path 91 and a conducting path 142 so that, each time a new bit of the data stream is received by the shift register 86, the contents of one of the latches of the delay register 128, or the contents of the latch 134 itself, are shifted into the latch 134.

Returning to FIG. 2, the data bit shifter 56 of the prewrite compensation circuit 12 is further comprised of a delay calibrator 144 which is used to enter delay words into the latches of the delay register 128 in a manner that will be described below. Prior to such description, it will be useful to consider the operation of the prewrite compensation circuit 12 during writing of data to a disc of the disc drive.

Operation of FIGS. 1 through 4

With reference to FIGS. 1 though 4, during the writing of a data stream to a disc, the data stream is first encoded in the 1,7 format by the data encoder 42 and transmitted to the data input of the shift register 86 which is clocked synchronously with the clocking of the data stream from the data encoder 42. Thus, each time a new bit of the data stream appears at the shift register data input, bits previously located therein are shifted to the right in FIG. 4 and the new bit is entered in the location N3. As the clock pulse rises, the latch 134 enters a delay word, which may be zero, at the output of the delay selection multiplexer 120 so that such delay word is transmitted to the variable delay 88 on bus 104. If, prior to such clock pulse, the bit in location C has a logic level zero, such level is shifted into the location P1 which is connected to the delay 96 (FIG. 3) feeding the delay circuit 94 via the conducting path 93 that, as shown in FIG. 4, is connected to the P1 bit position of the shift register 86. Since the bit that is shifted into the P1 bit location has a zero logic level, the output of the delay multiplexer 98 will either remain or become zero at a time determined by the delay word on the bus 104. Thus, no toggling of the write amplifier 38 will occur as a result of the clock pulse and the magnetization of the data track on the disc to which the stream is being written will remain unchanged.

Moreover, no change will occur to the delay time that is selected by the delay multiplexer 98 in response to the delay word received from the latch 134. While the zero logic level bit is in the location C of the shift register 86, the delay selection multiplexer 120 will transmit the contents of the latch 134 to the input of the latch 134 so that clocking the latch 134 merely re-enters the delay word currently therein. (Such reentry of the contents of the latch 134 into the latch 134 permits a previous non-zero bit, that is passed through the variable delay 88 as will be discussed below, to fully propagate through the variable delay 88 before any change can appear at the output of the delay selector 106.)

If, as the result of the clocking of shift register 86, a logic level zero is again entered into the central location C, the same events will occur on the next clock pulse. Thus, so long as zero logic levels are entered into the location C, the variable delay 98 will continue to receive the same delay word and the write amplifier will continue to pass a current through the read/write head in the same direction to result in the same direction of magnetization of the surface coating of the disc along the data track to which the data stream is being written.

With continued clocking of the data stream through the shift register 86, a bit having a non-zero logic level will eventually be clocked into location C of the shift register 86. Following such clocking, the pattern of bits of the data stream in the locations N3, N2, P2 and P3 will be transmitted to the decoder 118 so that, while the non-zero bit is in location C, the decoder 118 will cause the delay selection multiplexer 120 to transmit a delay word in one of the latches of the delay register 128 to the input of the latch 134 except in the case in which the pattern of bits in the locations N3, N2, P2 and P3 is the pattern which will result in maximum delay of an emf pulse upon reading of a magnetization reversal corresponding to the non-zero logic level in the location C. In this case, as discussed above, the output of the delay selection multiplexer 120 on bus 136 will be a delay word whose bits are all zero. Thus, at the time the next clock pulse rises, the delay word selected for the pattern of bits about the non-zero logic level in location C will be impressed on the input of latch 134.

When this subsequent clock pulse rises, the delay word is entered into latch 134 and transmitted to the variable delay 88 to cause the variable delay 88 to select a corresponding amount of delay by connecting one of the taps of the delay circuit 94 to the input of the write amplifier 39. Moreover, as the clock pulse rises, the non-zero logic level in location C is shifted into location P1 and transmitted therefrom to the delay circuit 94 via the delay 96 shown in FIG. 3. The delay 96 is a fixed delay circuit that delays the transmission of the non-zero logic level to the delay circuit 9 by an amount of time that is sufficient for the entry of a delay word into the latch 134 and the consequent selection of a tap between delay elements 100 before the non-zero bit reaches the delay circuit 94. Thus, when such level reaches the delay circuit 94, it will be passed down the series of delay elements 100 to the tap that has been selected by the delay multiplexer 98 and thence, through the delay multiplexer 98 to the write amplifier 39. In response, the write amplifier 39 will toggle to reverse the direction of the current through the read/-write head and write a magnetization reversal to the data track to which the data stream is being written.

It will be noted that such reversal will be written at a time following entry of the non-zero logic level into the location P1 of the shift register 86 that is a sum of three times: (1) the time for the logic level to propagate through the delay 96; (2) the time for the logic level to propagate through the delay circuit 94 to the selected tap between delay elements 100; and (3) the time for the logic level to propagate through the delay multiplexer 98. The first of these times will be the same for all non-zero logic levels of the data stream and the last can be made the substantially the same for all delay times by appropriate, conventional construction of the delay multiplexer 98. Specifically, the delay multiplexer 98 will be comprised of conventional gates and the propagation time through the multiplexer can be maintained substantially constant by providing the same number of gates between each of the inputs of the multiplexer 98 and the output thereof. Thus, the relative delays for the non-zero logic levels that are written to the disc are determined by the delay word that has been selected for writing the non-zero logic level. It is to the selection of these delay words that we now turn.

Delay Word Calibration

During the manufacture of a given type of disc drive which is to include prewrite compensation in accordance with the present invention, nominal delay words, corresponding to delay words appropriate for nominal operating conditions for the prewrite compensation circuit 12 for each pattern of bits about a non-zero bit to be written to a track of a disc, are determined for every frequency zone on the discs. To this end, the read channel 44 of the disc drive is computer modeled and assumed shapes for isolated emf pulses are used to select approximate values for the nominal delay words by mathematically superposing emf pulses associated with the patterns of surrounding bits on the emf pulse for a central, non-zero bit. Specifically, the approximate nominal delay word for each pattern is selected as the negative of the peak shift, expressed in units of delay time corresponding to the bit propagation time for a delay element 100 of the delay circuit 94, that such pattern will ideally produce in a selected pulse The computer model is then run to determine the effect that prewrite compensation using the approximate nominal delay words to provide prewrite compensation will have on the error rate in writing and subsequently reading data from a disc. The values of the nominal delay words are then adjusted to minimize error rate. Conventional margin testing on a selection of disc drives of the given type is then used to experimentally verify that the resulting nominal delay words will minimize error rate and, if need be, to further adjust the delay words.

Once these delay words have been selected, calibration words related to the delay words in a manner that will be discussed below are stored in a guard ring on one of the discs so that, as a disc drive is delivered to a user, it will contain each of the calibration words for each pattern of bits that might appear in the locations N3, N2, P2 and P3 of the shift register 86 and for each frequency zone of the discs. These calibration words are used to enter appropriate delay words into the latches of the delay register as will now be described with reference to FIG. 5 wherein is shown one preferred circuit for the delay calibrator 144.

Figure 5:
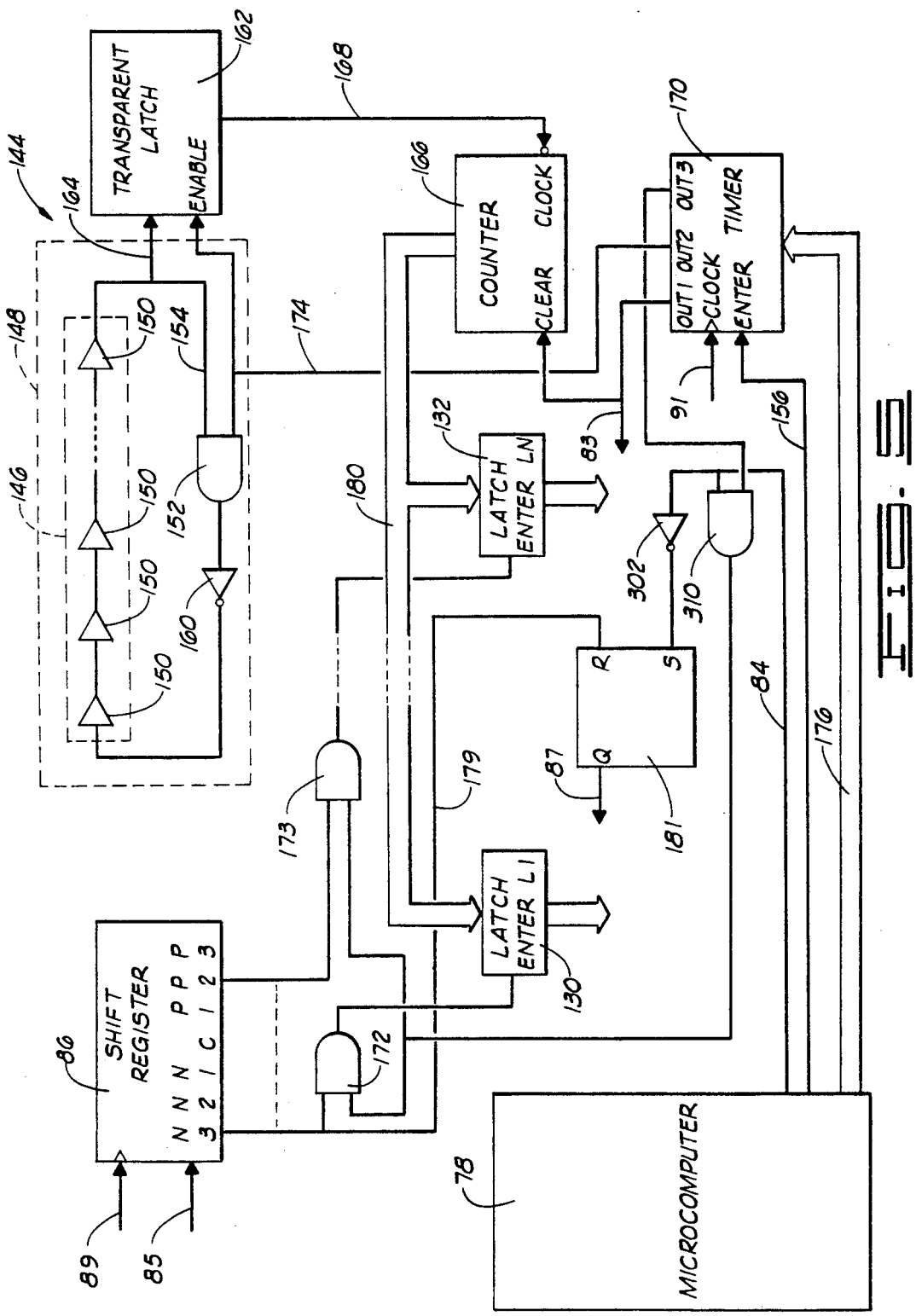
FIG. 5 is a schematic circuit diagram of one preferred form of the delay calibrator for the prewrite compensation circuit.

As shown in FIG. 5, the delay calibrator 144 is comprised of a second delay circuit 146 which, like the delay circuit 94, is comprised of a series of delay elements 150. (Consistently with the reference to the delay circuit 146 as a "second" delay circuit, the delay circuit 94 will, at times, be referred to herein as the "first" delay circuit.) Moreover, the delay elements 150 are chosen to have the same construction as the delay elements 100. The delay circuit 146 is formed on the same silicon chip as the chip whereon the delay circuit 94 is formed so that the delay elements 150 will have substantially the same electrical characteristics as the delay elements 100 and, further, will be subject to the same operating conditions as the delay elements 100. Thus, for any given power supply voltage used to operate the prewrite compensation circuit 12 and for any temperature of the disc drive containing the prewrite compensation circuit 12, the delay elements 150 will have the substantially the same pulse propagation times of the delay elements 100.

The input to the second delay circuit 146 is connected to the output of an inverter 160 and the input of the inverter is connected, via an AND gate 152, to the output of the delay circuit 146. At such times that the AND gate 152 is disabled, the output of the inverter 160 will be high and, consequently, after the AND gate has been disabled for a short time, the outputs of each of the delay elements 150 will be high. Thus, one input to the AND gate 152, on conducting path 154 from the last delay element of the delay circuit 146, will be high so that the AND gate can be enabled by a high level signal delivered to the other input thereof on a conducting path 174. If the AND gate 152 is now enabled, in a manner to be discussed below, the inverter 160 and the second delay circuit 146 will form a ring oscillator which has been generally indicated at 148 in FIG. 5. More specifically, any logic level at the output of the second delay circuit 146 will be inverted by the inverter 160 and returned to the input of the second delay circuit 146 so that the complement of such logic level will propagate down the second delay circuit 146 to be inverted to the original logic level at output of the inverter 160. This original logic level then propagates down the second delay circuit 146 to return the oscillator 148 to its original state. Thus, the second delay circuit 146 will oscillate with a period that is twice the time required for a pulse to propagate through the second delay circuit 146, the inverter 160 and the AND gate 152. The propagation times of the inverter 160 and AND gate 152 can be made substantially equal to the propagation times of the delay elements 150 so that the period of oscillation of the ring oscillator 148 will be an integral multiple of the delay time for one of the delay elements 150.

The calibration circuit 144 is further comprised of a transparent latch 162; that is a latch that can be enabled, via a high logic level on the conducting path 174 by means of which the AND gate 152 is enabled, to transmit a logic level at its input or disabled to store the logic level currently at its input. The input of the transparent latch 162 is connected to the output of the second delay circuit 146 via a conducting path 164 and the output of the transparent latch 162 is connected to an inverting input of a counter 166 via a conducting path 168. Thus, the oscillations of the ring counter 148 will be counted by enabling the transparent latch 162 when the AND gate 152 is enabled to form the ring oscillator 148.

The formation of the ring counter 148 and concurrent enablement of the transparent latch 162 is effected by a conventional timer 170 that operates in accordance with a timing diagram to be discussed below with respect to FIG. 9. The timer 170 has a first output terminal connected to the conducting path 83 leading to the clock 2 input of the mode selection multiplexer 82 shown in FIG. 2 so that, when the mode selection multiplexer 82 receives a calibration mode signal on conducting path 84, the shift register 86 will be clocked by pulses that appear at the first output terminal of the timer 170. The conducting path 174, that is connected to the AND gate 152 and the enable terminal of the transparent latch 162, is connected to a second output terminal of the timer 170 so that the timer 170 can form the ring oscillator 148 and enable oscillations of the ring counter 148 to be counted in a manner that will be described below. A third output terminal of the timer 170 is connected to one input of an AND gate 310 that receives, at its other input, the calibration mode signal on the conducting path 84 (FIG. 2) by means of which the microcomputer 78 places the mode selection multiplier 82 in the calibration or operating mode as discussed above.

Also shown in FIG. 5 are selected ones of the latches of the delay register 128; specifically, the latches 130 and 132 shown in FIG. 4, and the shift register 86. As shown in FIG. 5, the inputs of the latches of the delay register 128 are all connected to the output of the counter 166, via a bus 180 so that the contents of the counter 166 can be entered into any latch by an enter signal received at an enter terminal of the latch. These signals are received from the shift register 86 via AND gates having one input connected to a bit position of the shift register 86 and an output connected to the enter terminal of a delay word latch as shown by AND gates 172 and 173 for the delay word latches 130 and 132 respectively. (This connection of the shift register 86 to the delay calibrator 144 has been schematically indicated at 186 in FIG. 2) The AND gates are enabled during delay word calibration by a signal received from the output of the AND gate 310.

The delay calibrator 144 is further comprised of an RS flip flop 181 that is set during the operating mode, and prior to any calibration of the delay words at start up, by connection of the S input of the flip flop 181 to the conducting path 84, via an inverter 302, by means of which the calibration and operating modes of the mode selection multiplexer are selected as discussed above. The conducting path 87, to the data 2 input of the mode selection multiplexer 82 (FIG. 2) is connected to the Q output of the flip flop 181. The reset terminal of the flip flop 181 receives the logic level at the N3 bit position of the shift register 86 via a conducting path 179 for a purpose to be discussed below.

It will be useful, before proceeding to a discussion of the manner in which the delay calibrator 144 operates, to consider the relationship between the nominal delay and calibration words. Each delay word is merely the number of delay elements 100 of the delay circuit 94 through which a non-zero pulse is to propagate to reach the delay multiplexer 98 and, for nominal operating conditions, is selected for each zone frequency and each pattern of bits of a data stream about a bit to be written as described above. Thus, each delay word is an integer that is to be expressed digitally and stored in a selected latch while writing takes place at a particular frequency. Such integer, for nominal operating conditions, will be referred to by the letter N and the corresponding calibration word will be referred to by the letter K in the discussion to follow. Corresponding to each zone write frequency will be a period that will be indicated by the symbol Tz. In the discussion to follow, such period will be considered to be expressed in units of delay equal to the time of a pulse to propagate through a delay element 100 or 150. Similarly, the period of the ring oscillator 148, for nominal conditions of temperature and power supply voltage, will be considered to be expressed in units of delay equal to the time required for a pulse to propagate through a delay element 100 or 150 and will be indicated by the symbol Tnom. With this notation, the calibration words are numbers that satisfy the following relation:

$$N \text{ Tnom} = K \text{ Tz} \tag{1}$$

Calibration is effected in a manner that will now be described. As noted above, the calibration words are stored on a guard track of a disc and the microcomputer is programmed to read such track as part of the start-up procedure of the disc drive and store the calibration words in RAM with which the microcomputer 78 is provided. It is further programmed to carry out a delay word calibration every time the read/write heads are moved from one zone to another and, further, the calibration will be carried out using the zone frequency of the new zone. To this end, the microcomputer 78 adjusts the frequency of the variable frequency clock 90; for example, in the manner described in the aforementioned U.S. Pat. No. 4,799,112 to Bremmer et al, at the initiation of a move of the read/write head to a track in a new zone. The calibration is then carried out while the move is made.

As noted above, prior to the calibration, the flip flop 181 is set by a low logic level on the conducting path 84. Thus, when calibration is started by providing a calibration mode signal to the mode selection multiplexer 82, a high logic level will be present at the second data input terminal of the mode selection multiplexer and will be transmitted to the data terminal of the shift register 86. The calibration word corresponding to the delay word to be entered into the latch 130 is then transmitted to the timer 170 on the bus 176 and entered via a signal on a conducting path 156 from the microcomputer 78.

The response of the timer 170 to entry of the calibration word and clock signals received from the variable frequency clock 90 on conducting path 91 is shown in FIG. 9. Initially, the timer 170 provides a clock pulse 178 from its first output terminal to the second clock terminal of the mode selection multiplexer 82 and such pulse is transmitted to the clock input of the shift register 86 to clock the high logic level into the N3 bit position of the shift register 86. This level is transmitted to the reset terminal of the flip flop 181, to reset the flip flop 181, with the result that the voltage level at the Q output of the flip flop 181 drops to eliminate the high logic level the flip flop 181 has previously provided to the data terminal of the shift register 86 via the mode selection multiplexer 82. Thus, for the remainder of the calibration, only zero logic levels can be clocked through the shift register 86. The pulse 178 is also transmitted to a clear terminal of the counter 166 to set the contents of the counter 166 to zero.

Shortly thereafter, the second output terminal of the timer 170 goes high as indicated at 182 in FIG. 9, and remains high for a time that is equal to a number of clock pulses of duration Tz specified by the calibration word K that has been entered in to timer 170. The transition of the second output terminal of the timer 170 to a high level enables the AND gate 152 to form the ring oscillator 148 and enables the transparent latch 162 to transmit oscillations of the ring oscillator 146 to the clock terminal of the counter 166. (The inversion at the clock terminal of the counter 166 results in the entry of the number "1" into the counter 166 at the expiration of the time required for a logic level to traverse the delay circuit 146.) At the end of the time K Tz, the second output terminal of the timer 170 returns to a low logic level, as indicated at 185 in FIG. 9 to disable the latch 162 and thereby discontinue counting by the counter 166. At the same time, the AND gate 152 will be disabled so that the delay circuit 146 will return to its initial state. The number M in the counter is then transferred to the latch 130 by a pulse 300 (FIG. 9) that is transmitted from the third output terminal of the timer 170 to the enter terminal of the latch 130 via the AND gate 172 that has been enabled by the high logic level shifted into the bit position N3 at the beginning of calibration of the delay words. Since the second terminal of the timer 170 is active for a time K Tz, the following relation will be satisfied:

$$M \text{ Tosc} = K \text{ Tz} \tag{2}$$

where Tosc is the period of the oscillator 148 under current operating conditions. As can be seen by a comparison of equations (1) and (2), M and N will be the same number whenever the current operating conditions are the nominal conditions for which the nominal delay and calibration words are selected.

If, on the other hand, current operating conditions are not nominal, the numbers N and M, for the nominal delay words and the values in the counter 166 at the conclusion of a time period fixed by the timer 170 respectively, will be related by $$M = N \text{ Tnom/Tosc}. \tag{3}$$

Thus, if current operating conditions are such that the propagation time of pulses down the second delay circuit 146 is shorter than such time at nominal conditions, so that Tosc will be less than Tnom, M will be greater than N by the factor Tnom/Tosc. Conversely, if the current operating conditions are such that the propagation time of pulses down the second delay circuit 146 is greater than such time for nominal conditions, M will be smaller than N by the factor Tnom/Tosc. Thus, the number stored in the latch 130 will correspond to an absolute delay time that a non-zero bit of the data stream is to be delayed to eliminate peak shift for the pattern of surrounding data stream bits for which the latch 130 supplies a delay to the delay selection multiplexer 120.

Calibration is then completed by entering each of the remaining calibration words in succession into the timer 170 to repeat the cycle described above. With the entry of each calibration word, the pulse 178 (FIG. 9) that appears at the first output terminal of the timer 170 is transmitted, via the conducting path 83 and the mode selection multiplexer 82, to the clock input terminal of the shift register 86 to shift the logic level entered into the shift register N3 bit location by the first such cycle down the shift register bit locations to successively enable the AND gates, such as the gates 172 and 173 shown in FIG. 5, provided for each of the delay word latches of the delay register 128. Once all delay words have been calibrated, the microcomputer 78 returns the disc drive 10 to the operating mode by discontinuing the calibration mode signal on the conducting path 84. Thus, the mode selection multiplexer 82 will transmit data bits of information to be written to a disc and clock signals from the variable frequency clock 90 to the shift register 86 and, at the same time, the AND gates connected to the enter terminals of the delay word latches will be disabled so that the delay words in these latches will remain fixed until the next calibration.

Additionally, it has been found that the delay calibrator 144 can be used for a variety of purposes. Thus, for example, an additional use for the delay calibrator 144 is the stretching of pulses that are generated for the drive interface 14 by the data decoder 50 during return of data from the discs. Such pulse stretching can be carried out by delaying the pulses and then ORing the delayed pulse with the undelayed pulse. As will be clear to those skilled in the art, the delayed pulse can be provided by passing the undelayed pulse through a delay circuit that is constructed in the same manner as the variable delay 88 so that the amount of delay is determined by a delay word stored in a latch in the same manner that delay words are stored in the latches of the delay register 128. Similarly, the delay value in such a latch can be calibrated as has been described above. Thus, while the delay calibrator 144 has been described in the context of prewrite compensation in which delay words are stored in a plurality of latches for use in delaying pulses to be written to a disc, it will be clear that the utility of the delay calibrator 144 extends beyond such context to the calibration of a single delay word, or a plurality of delay words, which may be used to effect a delay for any purpose.

Description of FIG. 6

FIG. 6 illustrates a second construction, designated 144A, for the delay calibrator that is used to update the delay words that are stored in the latches of the delay register 128. The delay calibrator 144A is comprised of a timer, a counter, two inverters, a transparent latch, a flip flop and AND gates that are identical to the timer 170, the counter 166, the inverters 160 and 302, the transparent latch 162, the flip flop 181 and the AND gates 152, 172 and 173 found in the delay calibrator 144 and such components have been indicated in FIG. 6 using the same numerical designations used in FIG. 5. Similarly, the latches in FIG. 6, whose contents are the delay words, have been given the same numerical designations that have been used in FIG. 5.

The delay calibrator 144A differs from the delay calibrator 144 in that a second delay circuit, such as the delay circuit 146 in FIG. 5, is not used to form a ring oscillator for calibration of the delay words. Rather, as shown in FIG. 6, the delay circuit 94, through which bits to be written to a disc are passed, is used to form a ring oscillator 148A. To this end, a normally open electronic switch 188, closable by the calibration mode selection signal appearing on the conducting path 84 and transmitted to the switch 188 via a conducting path 304, is placed between the input of the delay circuit 94 and the output of the inverter 160 to prevent the delay calibrator 144A from interfering with the writing of data. A second electronic switch, a normally closed switch 190 that is also controlled by the calibration mode selection signal on the conducting paths 84 and 304, is provided to connect the bit location P1 of the shift register 86 to the input of the delay circuit 94 in the operating mode of the disc drive 10 while opening in the calibration mode to prevent interference between the shift register 86 and the ring oscillator 148A. (As is conventional, the write amplifier 39 must be enabled to write to a disc by a write enable signal from the microcomputer 78. In the calibration mode, no write enable signal is issued so that oscillations in the oscillator 148A will not be transmitted, as data, to a disc.) Calibration of the delay words using the delay calibrator 144A is carried out in the manner described above with respect to the delay calibrator 144.

Description of FIG. 7

FIG. 7 illustrates an alternative construction for portions of the data bit shifter, designated 56A in FIG. 7, of a prewrite compensation circuit constructed in accordance with the present invention. In the data bit shifter 56A, the shift register 86 is replaced by a shift register 86A having a larger capacity than the shift register 86 so that prewrite compensation can be effected using a larger number of bits in a data stream surrounding a bit that is to be written to a disc. Further, for purposes of example, the shift register 86A has been drawn for the case in which the data stream is formatted for writing to a disc in the 2,7 code. For this purpose, and consistently with the scheme of illustration of the shift register 86 in FIG. 4, the data locations of the shift register 86A have been indicated by the letter C, for the central location which contains a bit to be stored at the time that a delay word is selected for determining the amount the writing of the bit is to be delayed, the letters N1 through N8, for the next eight bits that will be shifted into the location C, and P1 through P8, for the eight bits that have previously been shift through the location C. No connections have been made from the locations N1, N2, P1 and P2 to the delay selector; consistently with the rules of the 2,7 code, the locations N1, N2, P1 and P2 will all contain zero logic levels when a non-zero logic level is located in the location C.

Additionally the data bit shifter 56A differs from the data bit shifter 56 in that the delay register 128 (not numerically designated in FIG. 7) is divided into first, second and third sections, designated by the numerals 196, 198 and 200 respectively in FIG. 7 and the delay selector 106 (not numerically designated in FIG. 7) is similarly divided into first, second and third sections that have been designated by the numerals 202, 204 and 206 respectively. Each delay register section 196, 198, 200 is substantially a duplicate of the delay register 128 shown in FIG. 4, differing only in the number N of latches contained in the sections and, similarly, each of the delay selector sections 202, 204 and 206 is substantially a duplicate of the delay selector 106 shown in FIG. 4 differing only in the number N of patterns detected by the decoder and the corresponding number N of connections to the multiplexer from the decoder and the latches. Similarly, the connections between the first, second and third delay register sections, 196, 198 and 200 respectively, and the first, second and third delay selector sections, 202, 204 and 206 respectively, are those illustrated in FIG. 4 for the data bit shifter 56. Connections between the delay selector sections, the location C of the shift register 86A, and the variable frequency clock 90 are as shown in FIG. 4 with such connections being indicated in FIG. 7 by the numbering of the inverter 140 and conducting path 142 shown in both drawings.

In the data bit shifter 56A, the first delay selector section 202 is connected to positions N5 through N8 of the shift register 86A and the latches (not shown) of the first delay register section 196 contain delay word elements that are determined as described above to reflect the peak shift effect that non-zero bits in the locations N5 through N8 can have, upon readback, on a non-zero bit located in the location C. Similarly, the second delay selector section 204 is connected to the shift register locations N4, N3, P3 and P4 and the third delay selector section 206 is connected to the locations P5 through P8. The second and third delay register sections 198 and 200 contain delay word elements that are selected and have the same significance as the delay word elements in the first delay register section 196.

Consistently with the 2,7 code, five possible patterns of data bits having at least one non-zero bit might be contained in the locations N5 through N8 and in the locations P5 through P8 at such times that a non-zero bit is contained in the location C; specifically, the patterns that can be represented in digital numbers as 1000, 0100, 0010, 0001 and 1001. Corresponding to these patterns, each of the first and third delay register sections, 196 and 200, contains five latches for storing data word elements. Similarly, nine possible patterns of bits might be contained in the locations N4, N3, P3 and P4 for a non-zero bit in location C. Such patterns are all combinations of the patterns 00, 10, and 01 in locations N4 and N3 with the same patterns in the locations P3 and P4. Corresponding to these nine patterns, the delay register second section 198 contains nine latches for storing delay word elements.

In a prewrite compensation circuit containing the data bit shifter 56A, the delay words to be transmitted to the variable delay 88 are sums and differences of the delay word elements stored in the delay register sections and the data bit shifter 56A is further comprised of a delay accumulator 208 that is connected to the delay selector sections, via buses 210, 212 and 214 that are analogous to the bus 104 in FIG. 4, for generating the delay word from the delay word elements. The output of the delay accumulator 208 is connected to the delay multiplexer 98 of the variable delay 88 as shown in FIG. 3 and as indicated by an output bus, designated 104, from the delay accumulator 208 in FIG. 7.

To describe the operation of the delay accumulator 208, which is a logic circuit constructed using standard design principles, it will be necessary to further consider the effect that surrounding bits will have on a bit written to a disc upon readback As will be clear to those skilled in the art, successive magnetization reversals on a disc are equivalent to magnetic charges of opposite sign so that the peak shifting effect of non-zero bits in the locations N5 through N8 and P5 and P8 will depend upon whether non-zero bits are located in the locations N3 and N4 and P3 and P4. Thus, for example, if the location N7 contains a non-zero bit when a nonzero bit to be written to a disc is in the location C and the locations N3 and N4 both contain zero bits, the emf pulse corresponding to the bit in the location N7 will have a sense opposite that of the pulse corresponding to the bit in the location C when the data stream is read back. Thus, portions of the emf pulse corresponding to the bit in the location N7 will be subtracted from the pulse corresponding to the bit in location C when the data is read back. On the other hand, if the location N3 also contains a non-zero bit, the emf pulse corresponding to the bit in the location N7 will have the same sense as the pulse corresponding to the bit in the location C. Thus, portions of the emf pulse corresponding to the bit in N7 will add to the emf pulse corresponding to the bit in the location C. Accordingly, bits in the locations N5 through N8 will have opposite peak shifting properties on a bit in location C depending upon the contents of the locations N3 and N4 and the same will be true for bits in locations P5 through P8. To compensate for this peak shift effect reversal for the locations N5 through N8 and locations P5 through P8 by the presence of non-zero bits in the locations N4, N3, P3 and P4, the data bit shifter 56A is further comprised of XOR gates 216 and 218 to provide the parity of the bits in N3 and N4 and in P3 and P4 respectively to parity terminals of the delay accumulator 208. The delay word is then generated in the delay accumulator 208 by adding the contents of the selected latches of the first and third delay register sections 196 and 200, or the two's complements of such contents, to the contents of the latch selected from the second delay register section 198 in accordance with the parity of the shift register locations N3 and N4 and P3 and P4. In operation, the delay accumulator 208 is clocked, via clock pulses received on conducting path 222, to receive the parity bits from the gates 216, 218 as a non-zero bit is clocked from the location C of the shift register 86A to the position P1 and, subsequently, to present the delay word on the conducting path 104 as such bit is clocked from the position P1 to the position P2.

The delay word elements are determined and loaded into the latches of the delay register sections in the same manner that has been described above for the data bit shifter 56 and, to this end, the shift register 86A is connected to the delay word latches in the manner that has been described above with respect to FIG. 5. It should be noted that, with the use of increasing numbers of bits surrounding a non-zero bit to be written to a disc, the number of delay word latches may exceed the number of shift register bit positions required for detecting the pattern of such surrounding bits. In this case, the shift register 86A can be provided with additional bit positions to the right of the position P8 shown in FIG. 7.

Description of FIG. 8

FIG. 8 illustrates a third embodiment of a data bit shifter, designated 56B in FIG. 8, for a prewrite compensation circuit constructed in accordance with the present invention As shown in FIG. 8, the data bit shifter 56B includes the variable frequency cock 90, the shift register 86, the variable delay 88, the delay register 128 and the delay selector 128 as illustrated in FIG. 2 and it is contemplated that these components may include any of the variations that have been described above. Thus, for example, the shift register indicated at 86 in FIG. 8 might equally well be the shift register 86A. In this case the delay register 128 and the delay selector 106 would be comprised of sections as in FIG. 7. Thus, the designation of the shift register in FIG. 8 by the numeral 86 is for illustrative purposes only and is not intended to express a limitation on the scope of the invention.

The data bit shifter 56B differs from the data bit shifters 56 and 56A in that the delay calibrator 144 and the mode selection multiplexer 82 have been deleted from the data bit shifter 56B and the operation of the data bit shifter 56B has been modified accordingly In the data bit shifter 56B, the delay words, or delay word elements, are determined as has been described above and stored directly to a disc as the calibration words. Such words are read into the RAM of the microcomputer 78 during start up of the disc drive and the latches of the delay register 128 are updated at times described above with respect to the data bit shifters 56 and 56A by entering the delay words, or delay word elements, directly into the latches of the delay register 128 from the microcomputer 78 on a bus indicated at 220 in FIG. 8.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a data storage device of the type including a rotating disc having a magnetizable surface for magnetically storing data expressed as a serial data stream and write means responsive to non-zero bits of the data stream for writing the data stream to the surface of the disc, wherein the disc surface is formatted in a plurality of concentric zones for writing the data at a frequency selected for each zone, a prewrite compensation circuit for selectively delaying the writing of non-zero bits of the data stream to the disc surface comprising:

a shift register that receives the data stream;
variable clock means connected to the shift register for clocking the data stream through the shift register at a frequency selected for the zone of the disc surface to which the data stream is to be written;
delay mean connected between the shift register and the write means during writing of the data stream for transmitting electrical pulses corresponding to each non-zero bit of the data stream from the shift register to the write means after an amount of delay specified by an electrically expressed delay word received by the delay means;
a plurality of latches for storing a plurality of delay words, whereby each non-zero bit of the data stream can be delayed by a selected amount by transmitting the contents of a selected latch to the delay means;
latch selection means connected between the shift register and the latches for transmitting the contents of a selected latch to the delay means in relation to the pattern of bits of the data stream surrounding a non-zero bit to be stored; and
means for loading the delay words into the latches each time a transition is made from writing the data stream from one zone to writing the data stream to another zone, whereby the amount of delay for each pattern of bits of the data stream surrounding a non-zero bit to be written to the disc surface is selected in relation to the frequency at which the data stream is written to the disc surface.

2. The data storage device of claim 1 wherein the delay means comprises a delay circuit comprised of a plurality of serially connected delay elements; wherein the delay circuit is tapped at the outputs of the delay elements for providing a plurality of selectively delayed electrical pulses in response to electrical pulses received thereby; and wherein the means for loading the delay words into the latches comprises:

an inverter;
timing means for connecting the input of the inverter to the output of a selected delay element of the delay circuit and connecting the output of the inverter to the input of a selected delay element of the delay circuit for a selected time interval so as to form the inverter and selected elements of the delay circuit into a ring oscillator during said time interval;
a counter connected to the ring oscillator for counting oscillations of the ring oscillator during said time interval, wherein the counter is connected to each of the latches for entering the contents of the counter into a selected latch at the end of the time interval; and
means for enabling a selected one of the latches to enter the counter contents at the end of the time interval, whereby the latches can be loaded by counting oscillations of the ring counter for a plurality of time intervals and enabling each latch at the end of a selected one of the time intervals.

3. The data storage device of claim 1 wherein the delay means comprises a delay circuit comprised of a plurality of serially connected delay elements; wherein the delay circuit is tapped at the outputs of the delay elements for providing a plurality of selectively delayed pulses in response to electrical pulses received thereby; and wherein the means for loading the delay words into the latches comprises:

a second delay circuit comprised of a plurality of serially connected delay elements having substantially the same electrical characteristics as the delay elements of the delay circuit of the delay means;
an inverter;
timing means for connecting the input of the inverter to the output of a selected delay element of the second delay circuit and the output of the inverter to the input of a selected delay element of the second delay circuit for a selected time interval so as to form the inverter and selected elements of the second delay circuit into a ring oscillator during said time interval;
a counter connected to the ring oscillator for counting oscillations of the ring oscillator during said time interval, wherein the counter is connected to each of the latches for entering the contents of the counter into a selected latch at the end of the time interval; and
means for enabling a selected one of the latches to enter the counter contents at the end of the time interval, whereby the latches can be loaded by counting oscillations of the ring counter for a plurality of time intervals and enabling each latch at the end of a selected one of the time intervals.

4. In a data storage device of the type including a rotating disc having a magnetizable surface for magnetically storing data expressed as a serial data stream and write means responsive to non-zero bits of the data stream for writing the data stream to the surface of the disc, a prewrite compensation circuit for selectively delaying the writing of non-zero bits of the data stream to the disc surface comprising:

a shift register that receives the data stream;
clock means connected to the shift register for clocking the data stream through the shift register;
delay means connected between the shift register and the write means during writing of the data stream for transmitting electrical pulses corresponding to each non-zero bit of the data stream from the shift register to the write means after an amount of delay specified by an electrically expressed delay word received by the delay means;

a delay register comprising a plurality of delay register sections, wherein each delay register section is comprised of a plurality of latches for storing a plurality of delay word elements;

a delay word accumulator connected to the delay register sections for generating a delay word in relation to the delay word elements stored in a selected one of the latches of each of the delay register sections, wherein the delay word accumulator is connected to the delay means for providing the generated delay word to the delay means;

latch selection means connected between the shift register and the delay register sections for transmitting the contents of a selected latch of each section to the delay word accumulator in relation to a selected portion of the pattern of bits of the data stream surrounding a non-zero bit to be stored.

5. The data storage device of claim 4 wherein the disc surface is formatted in a plurality of concentric zones for writing the data at a frequency selected for each zone; wherein the clock means is further characterized as a variable clock means for clocking the data stream through the shift register at a frequency selected for the zone of the disc surface to which the data stream is written; and wherein the data storage device further comprises means for loading the delay word elements into the latches each time a transition is made from writing the data stream from one zone to writing the data stream to another zone, whereby the amount of delay for each pattern of bits of the data stream surrounding a non-zero bit to be written to the disc surface is selected in relation to the frequency at which the data stream is written to the disc surface.

6. The data storage device of claim 5 wherein the delay means comprises a delay circuit comprised of a plurality of serially connected delay elements; wherein the delay circuit is tapped at the outputs of the delay elements for providing a plurality of selectively delayed electrical pulses in response to an electrical pulse received thereby; and wherein the means for loading the delay word elements into the latches comprises:

an inverter;

timing means for connecting the input of the inverter to the output of a selected delay element of the delay circuit and connecting the output of the inverter to the input of a selected delay element of the delay circuit for a preselected time interval so as to form the inverter and selected elements of the delay circuit into a ring oscillator during said time interval;

a counter connected to the ring oscillator for counting oscillations of the ring oscillator during said time interval, wherein the counter is connected to each of the latches for entering the contents of the counter into a selected latch at the end of the time interval; and means for enabling a selected one of the latches to enter the counter contents at the end of the time interval, whereby the latches can be loaded by counting oscillations of the ring counter for a plurality of time intervals and enabling each latch at the end of a selected one of the time intervals.

7. The data storage device of claim 5 wherein the delay means comprises a delay circuit comprised of a plurality of serially connected delay elements; wherein the delay circuit is tapped at the outputs of the delay elements for providing a plurality of selectively delayed pulses in response to an electrical pulse received thereby; and wherein the means for loading the delay word elements into the latches comprises:

a second delay circuit comprised of a plurality of serially connected delay elements having substantially the same electrical characteristics as the delay elements of the delay circuit of the delay means;

an inverter;

timing means for connecting the input of the inverter to the output of a selected delay element of the second delay circuit and the output of the inverter to the input of a selected delay element of the second delay circuit for a preselected time interval so as to form the inverter and selected elements of the second delay circuit into a ring oscillator during said time interval;

a counter connected to the ring oscillator for counting oscillations of the ring oscillator during said time interval, wherein the counter is connected to each of the latches for entering the contents of the counter into a selected latch at the end of the time interval; and means for enabling a selected one of the latches to enter the counter contents at the end of the time interval, whereby the latches can be loaded by counting oscillations of the ring counter for a plurality of time intervals and enabling each latch at the end of a selected one of the time intervals.

8. In a data storage device of the type comprising:

a rotating disc having a magnetizable surface for magnetically storing data expressed as a serial data bit stream, wherein the disc is formatted in a plurality of concentric zones for writing the data bit stream to the disc surface at a plurality of frequencies selected for the zones;

means for writing the data stream to the disc at the frequencies selected for the zones; and means for reading the data from the disc, a method for compensating for bit shift in reading the data from the disc comprising the steps of:

writing non-zero bits of the data stream to the disk with a delay selected the in relation to one of a plurality of electrically expressed delay words selected in relation to the pattern of bits of the data stream surrounding such non-zero bit; and updating the delay words each time a transition is made from writing the non-zero bits of the data stream to one zone of the disk to writing the non-zero bits of the data stream to another zone of the disc.

9. The method of claim 8 wherein the means for writing the data to the disc is comprised of a delay circuit through which the data stream is passed during writing for effecting delay of non-zero bits of the data stream and a plurality of latches for storing the delay words; and wherein the step of updating the delay words comprises for each delay word the steps of:

inverting the output of the delay circuit;

returning the inverted output of the delay circuit to the input of the delay circuit for a selected time interval to give rise to oscillations in the delay circuit;

counting the number of oscillations during the time interval; and entering the number of oscillations counted during the time interval into the latch wherein the delay word is stored.

10. The method of claim 8 wherein the means for writing the data to the disc comprises:

a delay circuit through which the data stream is passed during writing for effecting delay of non-zero bits of the data stream;

a second delay circuit having electrical characteristics that are substantially the same as the characteristics of the delay circuit through which the data stream is passed; and a plurality of latches for storing the delay words; and wherein the step of updating the delay words comprises for each delay word the steps of:

inverting the output of the second delay circuit;

returning the inverted output of the second delay circuit to the input of the second delay circuit for a selected time interval to give rise to oscillations in the second delay circuit;

counting the number of oscillations during the time interval; and entering the number of oscillations counted during the time interval into the latch wherein the delay word is stored.

11. A circuit for loading an electrically expressed delay word into a latch used with a delay circuit and a multiplexer for selectively delaying an electrical input pulse, wherein the delay circuit is characterized as comprising a series of delay elements connected to the multiplexer for providing a plurality of delayed output pulses to the multiplexer in response to reception by the delay circuit of said electrical input pulse and wherein the multiplexer is connected to the latch for transmitting a selected one of said output pulses in relation to the delay word contained in latch, comprising:

an inverter:

timing means for connecting the output of a selected delay element to the input of the inverter and connecting the output of the inverter to the input of a selected delay element for a selected time interval so as to form the inverter and selected element of the delay circuit into a ring oscillator during said time interval;

a counter connected to the ring oscillator for counting oscillations of the ring oscillator during said time interval, wherein the counter is connected to the latch for entering the contents of the counter into the latch in response to an enter signal received by the latch; and means for providing the enter signal to the latch following said time interval.

12. A circuit for loading an electrically expressed delay word into a latch used with a first delay circuit and a multiplexer for selectively delaying an electrical input pulse, wherein the first delay circuit is characterized as comprising a series of delay elements connected to the multiplexer for providing a plurality of delayed output pulses to the multiplexer in response to reception by the first delay circuit of said electrical input pulse and wherein the multiplexer is connected to the latch for transmitting a selected one of said output pulses in relation to the delay word contained in latch, comprising:

a second delay circuit comprised of a series of delay elements having substantially the same electrical characteristics as the delay elements of the first delay circuit;

an inverter:

timing means for connecting the output of a selected delay element of the second delay circuit to the input of the inverter and connecting the output of the inverter to the input of a selected delay element of the second delay circuit for a selected time interval so as to form the inverter and selected elements of the second delay circuit into a ring oscillator during said time interval;

a counter connected to the ring oscillator for counting oscillations of the ring oscillator during said time interval, wherein the counter is connected to the latch for entering the contents of the counter into the latch in response to an enter signal received by the latch; and means for providing the enter signal to the latch following said time interval.

* * * * *

UNITED STATES PATENT AND TRADEMARK OFFICE
CERTIFICATE OF CORRECTION

PATENT NO. : 5,241,429

DATED : August 31, 1993

INVENTOR(S) : Steven V. Holsinger

It is certified that error appears in the above-indentified patent and that said Letters Patent is hereby corrected as shown below:

Column 1, line 30, delete "on" and substitute therefor --one--;

Column 4, line 23, delete "date" and substitute therefor --gate--;

Column 8, lines 42-44, delete "The passage of the data through the shift register 86 time a bit of the data stream is presented to the data time a bit of the data stream is presented to the data input" and substitute therefor
--The passage of the data through the shift register 86 is effected by clocking the shift 86 each time a bit of the data stream is presented to the data input--;

Column 9, line 19, after element, delete "10" and substitute therefor --100--;

Column 10, line 52, delete "design In" and substitute therefor --design. In--;

Column 11, line 32, delete "outputs These" and substitute there for
--outputs. These--;

Column 13, line 58, delete "9" and substitute therefor --94--;

Column 14, line 46, delete "pulse The" and substitute therefor --pulse. The--;

Column 20, line 37, delete "shift" and substitute therefor --shifted--;

Column 21, line 52, delete "readback As" and substitute therefor
--readback. As--;

Column 22, line 51, delete "cock" and substitute therefor --clock--; and

UNITED STATES PATENT AND TRADEMARK OFFICE
CERTIFICATE OF CORRECTION

PATENT NO. : 5,241,429
DATED : August 31, 1993
INVENTOR(S) : Steven V. Holsinger It is certified that error appears in the above-indentified patent and that said Letters Patent is hereby corrected as shown below:

Column 22, line 68, delete "accordingly In" and substitute therefor --accordingly. In--.

Signed and Sealed this

Sixteenth Day of May, 1995

Attest:

BRUCE LEHMAN

*Attesting Officer*     *Commissioner of Patents and Trademarks*